US011664759B2

(12) United States Patent
Ramos et al.

(10) Patent No.: US 11,664,759 B2
(45) Date of Patent: *May 30, 2023

(54) AUTONOMOUS SOLAR POWER SYSTEM

(71) Applicant: International Business Machines Corporation, Armonk, NY (US)

(72) Inventors: Igor S. Ramos, Round Rock, TX (US); Angelo Danducci, II, Austin, TX (US); Hilary Ricky, Austin, TX (US); Denny Nguyen, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 461 days.

This patent is subject to a terminal disclaimer.

(21) Appl. No.: 16/680,607

(22) Filed: Nov. 12, 2019

(65) Prior Publication Data

US 2021/0028740 A1    Jan. 28, 2021

Related U.S. Application Data

(63) Continuation of application No. 16/519,205, filed on Jul. 23, 2019.

(51) Int. Cl.
*H02S 10/40* (2014.01)
*H02S 20/32* (2014.01)
*H02S 30/20* (2014.01)
*G05D 3/10* (2006.01)
*G05B 11/36* (2006.01)

(52) U.S. Cl.
CPC ............. *H02S 10/40* (2014.12); *G05B 11/36* (2013.01); *G05D 3/105* (2013.01); *H02S 20/32* (2014.12); *H02S 30/20* (2014.12)

(58) Field of Classification Search
CPC .......... H02S 10/40; H02S 20/32; H02S 30/20; G05B 11/36; G05D 3/105; Y02E 10/50
See application file for complete search history.

(56) References Cited

U.S. PATENT DOCUMENTS 9,976,869 B2    5/2018  Akselrod et al.
10,461,421 B1  10/2019  Tran et al.
(Continued)

FOREIGN PATENT DOCUMENTS

CN      206041878 U    3/2017
CN      107052012 A    8/2017
(Continued)

OTHER PUBLICATIONS

"Object Detection with Ultrasonic Sensor (HC-SR04)," https://www.instructables.com/id/Object-Detection-With-Ultrasonic-Sensor-HC-SR04/, printed Apr. 9, 2019, 3 pgs.
(Continued)

*Primary Examiner* — Thomas C Lee
*Assistant Examiner* — Charles Cai
(74) *Attorney, Agent, or Firm* — Robert J. Shatto

(57) ABSTRACT

Provided is a method for relocating a solar power unit in response to a redeployment event. A first location of a deployed solar power unit may be determined. A processor may detect a redeployment event for the solar power unit at the first location. In response to the redeployment event, the processor may determine a new location for the solar power unit. The method may further comprise relocating the solar power unit to the new location.

20 Claims, 13 Drawing Sheets

(56) References Cited

U.S. PATENT DOCUMENTS

| | | | |
|---|---|---|---|
| 11,017,665 B1* | 5/2021 | Roy | G06Q 20/3224 |
| 2010/0057480 A1 | 3/2010 | Artin et al. | |
| 2011/0160964 A1* | 6/2011 | Obradovich | H04L 43/08 |
| | | | 701/41 |
| 2013/0127257 A1 | 5/2013 | Yamamoto et al. | |
| 2013/0285841 A1 | 10/2013 | Kirsch | |
| 2015/0148921 A1* | 5/2015 | Ito | H04W 4/80 |
| | | | 700/66 |
| 2018/0209803 A1 | 7/2018 | Rakah et al. | |
| 2018/0238305 A1 | 8/2018 | McMahon | |
| 2018/0248509 A1 | 8/2018 | Dayama et al. | |
| 2019/0105992 A1 | 4/2019 | Bucknell | |
| 2019/0106118 A1 | 4/2019 | Asakura et al. | |
| 2019/0126765 A1 | 5/2019 | Seo et al. | |
| 2019/0241037 A1 | 8/2019 | Hays et al. | |
| 2019/0248243 A1* | 8/2019 | Gaither | B60L 8/003 |
| 2019/0250621 A1* | 8/2019 | Ghannam | G08G 1/096741 |
| 2020/0031238 A1 | 1/2020 | Kydd | |
| 2020/0090519 A1* | 3/2020 | Ding | G08G 1/168 |
| 2020/0167365 A1 | 5/2020 | Troia et al. | |
| 2020/0185087 A1* | 6/2020 | Smith | G08B 27/00 |
| 2020/0207225 A1* | 7/2020 | Barbosa, Jr. | B60L 53/16 |
| 2021/0125500 A1* | 4/2021 | Mortazavi | G08G 1/0133 |
| 2021/0223779 A1 | 7/2021 | Passot | |
| 2021/0323430 A1* | 10/2021 | Kulik | B60L 8/003 |

FOREIGN PATENT DOCUMENTS

| | | |
|---|---|---|
| CN | 107546832 A | 1/2018 |
| CN | 207700564 U | 8/2018 |
| EP | 3166221 A1 | 5/2017 |
| JP | 2004140987 A | 5/2004 |
| JP | 3169441 U | 7/2011 |
| JP | 6275169 B2 | 2/2018 |
| WO | 2013132349 A3 | 9/2013 |

OTHER PUBLICATIONS

Ghemud, A., "How Much Electricity is Consumed to Charge an Electric Golf Cart?" http://www.golfcarsunlimited.com/electricityconsumedchargeelectricgolfcart/, printed Apr. 9, 2019, 2 pgs.

List of IBM Patents or Patent Applications Treated as Related, Nov. 7, 2019, 2 pgs.

Matasci, S., "Solar Panel Cost: Avg. Solar Panel Prices by State in 2019—EnergySage," https://news.energysage.com/how-much-does-the-average-solar-panel-installation-cost-in-the-u-s/, printed Apr. 9, 2019, 6 pgs.

Mell et al., "The NIST Definition of Cloud Computing," Recommendations of the National Institute of Standards and Technology, U.S. Department of Commerce, Special Publication 800-145, Sep. 2011, 7 pgs.

Pwrstation, "EXORAC," Solar Racking Systems, https://www.pwrstation.com/exorac, printed Apr. 10, 2019, 5 pgs.

Ramos et al., "Autonomous Solar Power System," U.S. Appl. No. 16/519,235, filed Jul. 23, 2019.

Ramos et al., "Autonomous Solar Power System," U.S. Appl. No. 16/680,615, filed Nov. 12, 2019.

Ramos et al., Autonomous Solar Power System, U.S. Appl. No. 16/519,205, filed Jul. 23, 2019.

Unknown, "Cost to Pave a Concrete Driveway—Estimates and Prices at Fixr," https://www.fixr.com/costs/concrete-driveway-paving, printed Apr. 9, 2019, 2 pgs.

Wikpedia, "Golf cart—Wikipedia," https://en.wikipedia.org/wiki/Golf_cart, printed Apr. 9, 2019, 5 pgs.

Xu et al., "Simple line follow program," http://www.mblock.cc/example/primary-line-patroling-program/, printed Apr. 9, 2019, 3 pgs.

Youtube, "EXOrac—36 Cells modules," https://www.youtube.com/watch?v=wldv4U2oXCl, printed Apr. 9, 2019, 2 pgs.

* cited by examiner

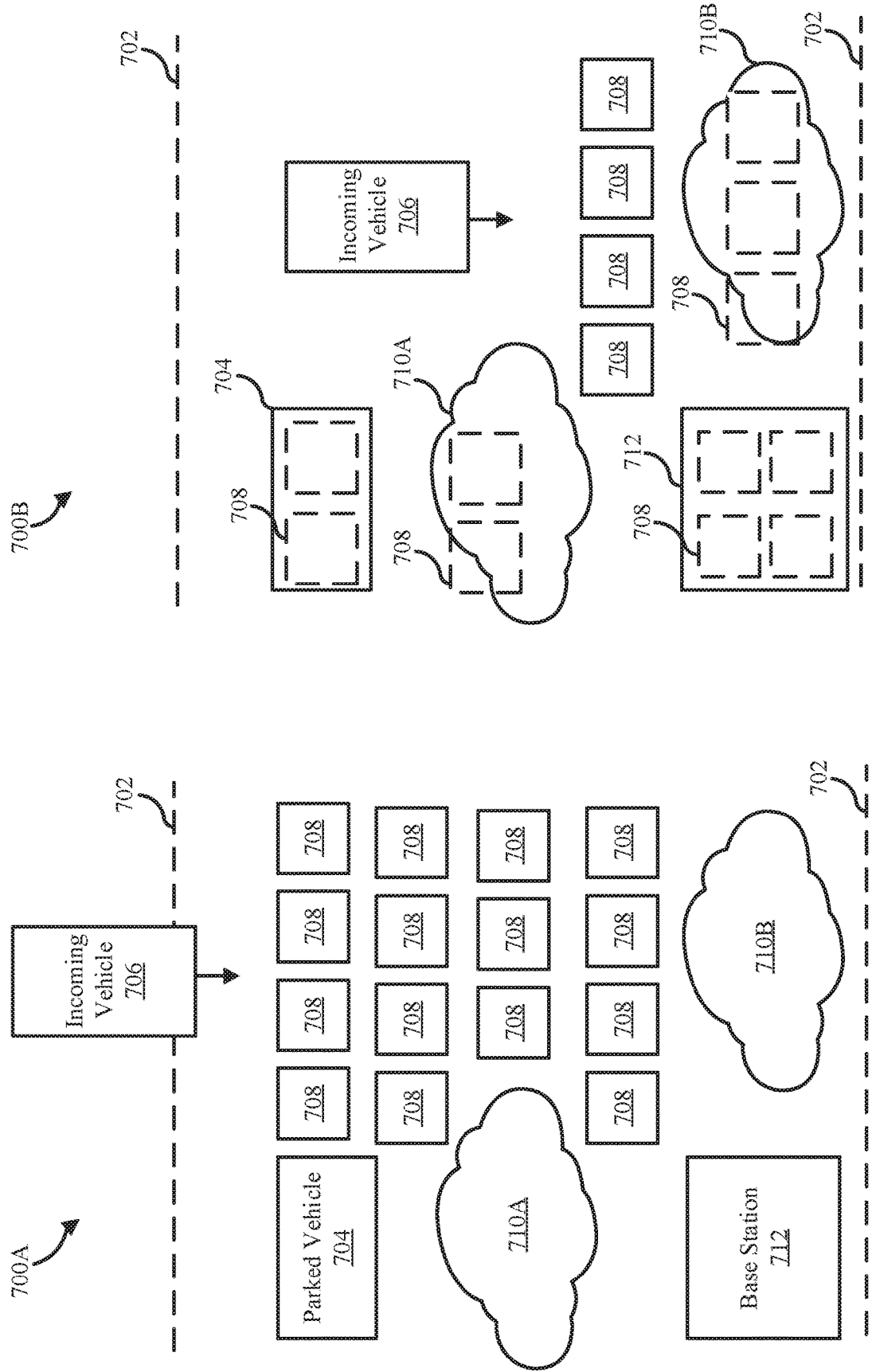

800
802 Solar power units stacked for storage
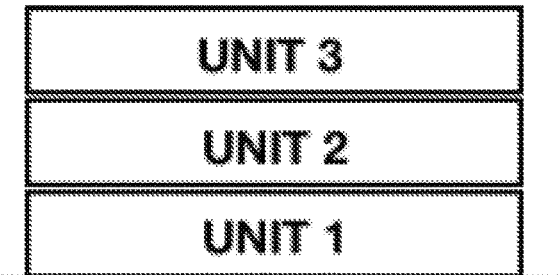
804 Unit 1 leaves storage
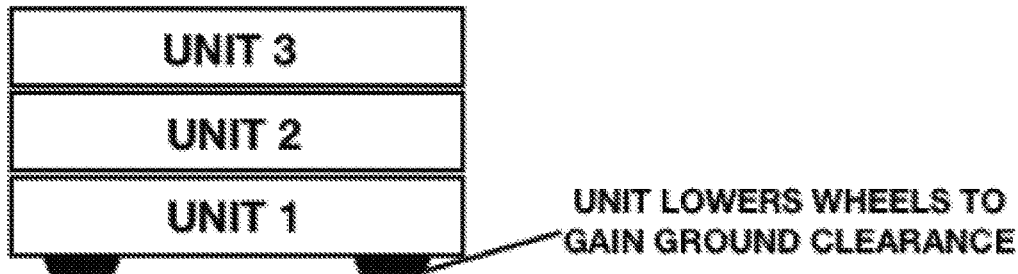
UNIT LOWERS WHEELS TO GAIN GROUND CLEARANCE
806 Coordination between Unit 1 and Unit 2
EXTENDING JACKSTANDS  CCW ROTATION  CW ROTATION
FIG. 8A

AUTONOMOUS SOLAR POWER SYSTEM

BACKGROUND

The present disclosure relates generally to the field of solar power systems, and more particularly to autonomous systems for generating electricity from sunlight.

Solar power is the conversion of energy from sunlight into electricity, either directly using photovoltaics (PV), indirectly using concentrated solar power, or a combination. Concentrated solar power systems use lenses or mirrors and tracking systems to focus a large area of sunlight into a small beam. Photovoltaic cells convert light into an electric current using the photovoltaic effect.

SUMMARY

Embodiments of the present disclosure include a method, computer program product, and system for relocating a solar power unit in response to a redeployment event. A first location of a deployed solar power unit may be determined. A processor may detect a redeployment event for the solar power unit at the first location. In response to the redeployment event, the processor may determine a new location for the solar power unit. The method may further comprise relocating the solar power unit to the new location.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

FIGS. 7A and 7B illustrate an example of a solar power unit swarm responding to a redeployment event, in accordance with embodiments of the present disclosure.

FIGS. 8A and 8B illustrate a deployment sequence for deploying stackable solar power units, in accordance with embodiments of the present disclosure.

Figure 1:
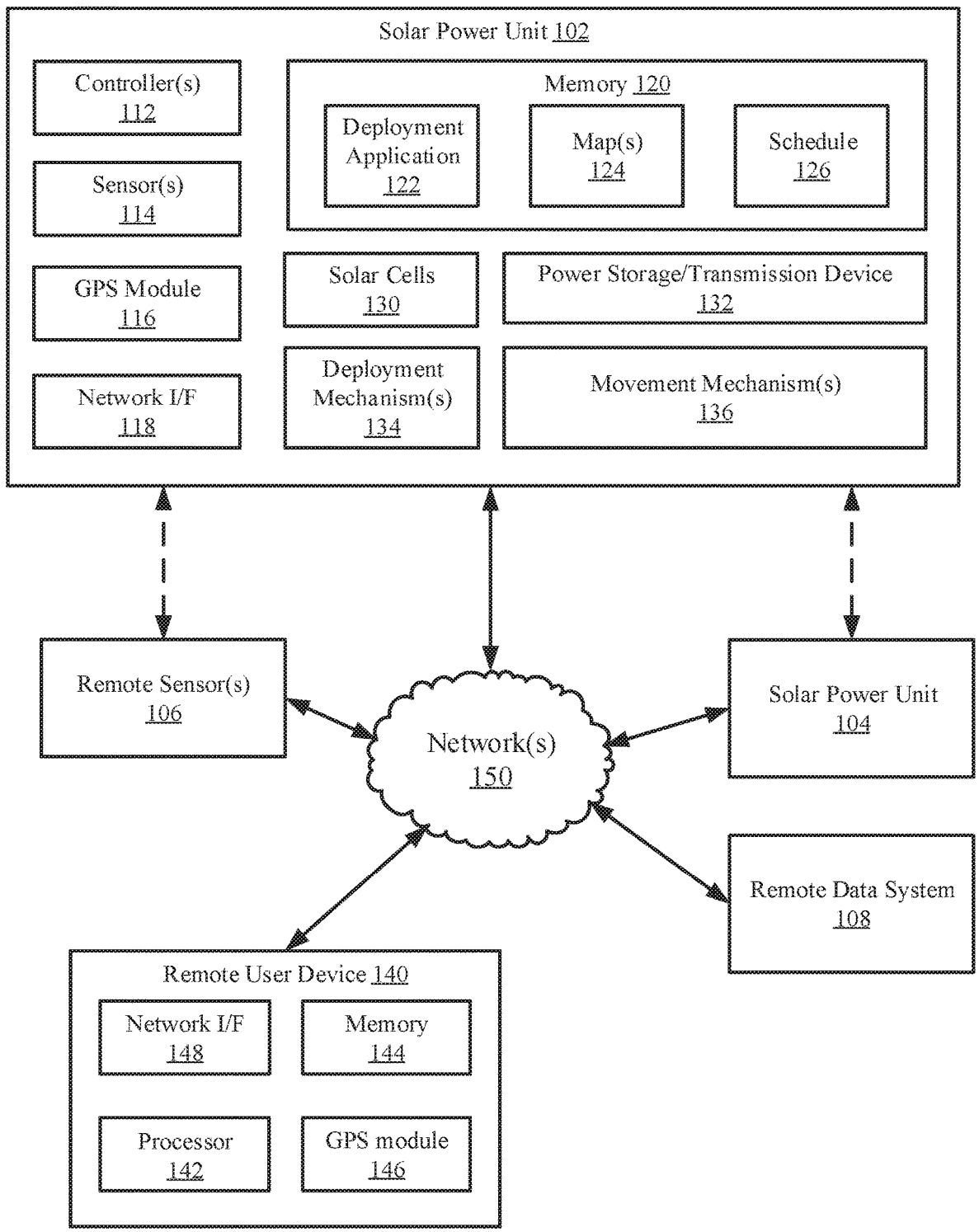
FIG. 1 illustrates a block diagram of an example autonomous solar power system, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of solar power systems, and in particular to autonomous systems for generating electricity from sunlight. While the present disclosure is not necessarily limited to such applications, various aspects of the disclosure may be appreciated through a discussion of various examples using this context.

Solar energy is effectively free to generate once the appropriate infrastructure is in place; however, there is a cost associated with setting up the infrastructure, and it is usually localized. There is also the challenge that solar panels require sun exposure, which is a limited resource that changes location based on the time of day.

Some advantages of a moveable solar panel system are that they generally have less expensive installation costs, and that they can be relocated if needed (e.g., to use the surface for other things, or if the solar panel user does not own the property). For example, a moveable solar panel system can be deployed to a surface that is mostly unused during daylight hours, such as a household driveway, and can be moved out of the way when the surface needs to be used for other things.

However, manually moveable solar systems are cumbersome to move around and set up on a daily basis. For example, solar power systems set up alongside a driveway would require that the user deploy the solar power system every time they leave their home. Furthermore, every time the user arrives home, he'd need to get out of his car to move his solar panels out of the way.

Embodiments of the present disclosure may overcome the above, and other, problems by using an autonomous solar power system. The autonomous solar power system may be configured to detect a redeployment event and automatically deploy/undeploy one or more solar power units based on the event. As used herein, a redeployment event is any event that causes the autonomous solar power system to change its state (e.g., from a deployed state to an undeployed state or vice versa) and/or location. For example, redeployment events may include, without limitation, a user leaving the home for the day, a user returning home, upcoming bad weather, time of day, etc. Furthermore, as used herein, an autonomous solar power system is a system that includes one or more solar power units capable of automated deployment and/or relocation. When describing embodiments of the autonomous solar power system that include a single solar power unit, the terms "autonomous solar power system" and "solar power unit" may be used interchangeably herein.

For example, a few minutes after a user leaves for work, his solar power unit, which is stored in the back of his garage, opens the garage door and moves itself into the user's driveway to start collecting solar energy. During the day, as shade moves onto the user's property, the solar power unit moves to get optimal energy generation. If an unannounced guest comes to the driveway, the solar power unit self-retracts for a few minutes to yield the way. Additionally, the solar power unit knows when the user is about to get home, so the solar power unit opens the garage door and stores itself back where the user left it shortly before the user arrives home. Finally, at the end of the day, when the sun is gone, the solar power unit stores itself back in the garage.

Figure 2:
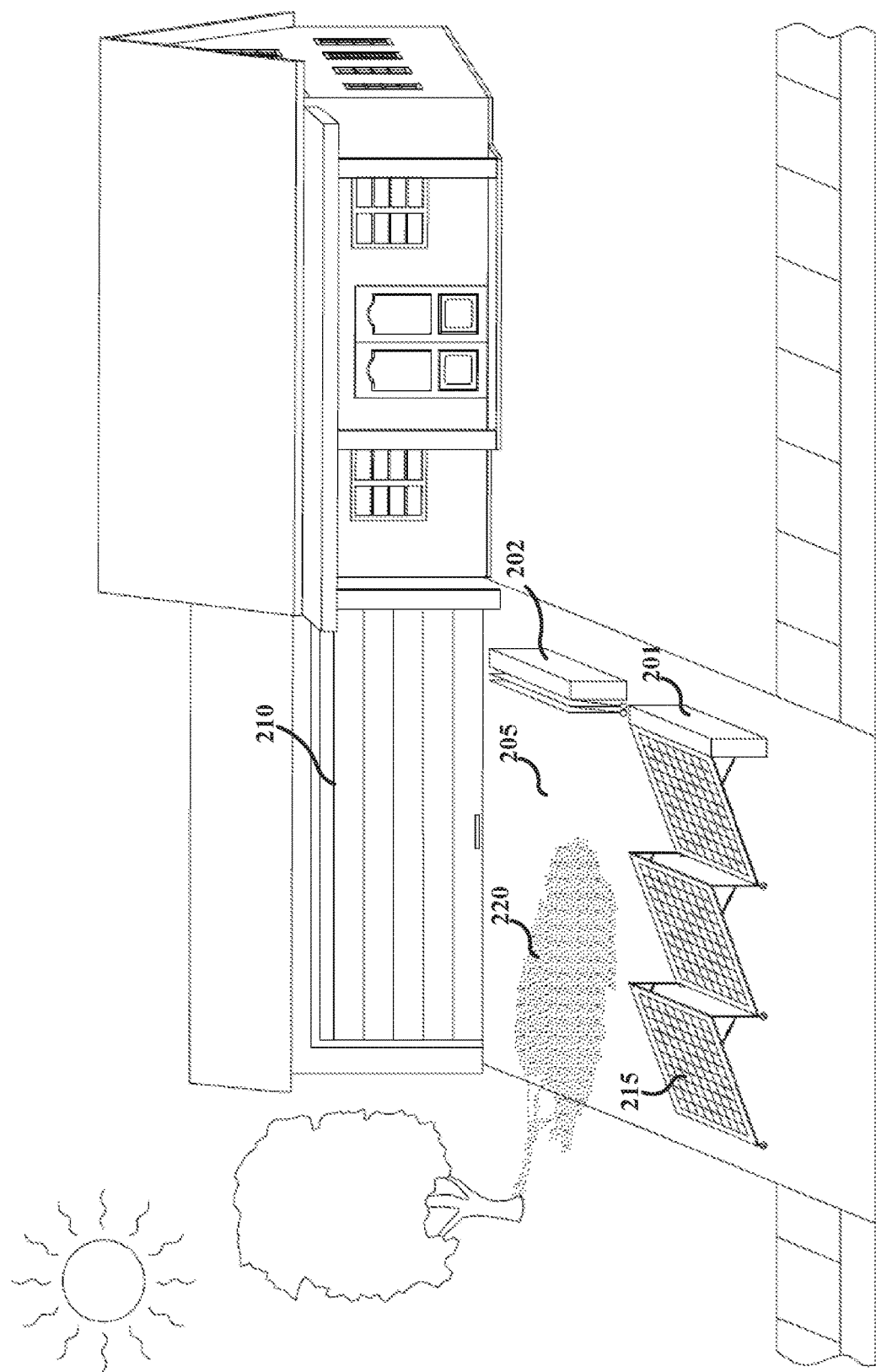
FIG. 2 illustrates an example solar power system in a deployed and an undeployed state, in accordance with embodiments of the present disclosure.

Some embodiments utilize a pivoting solar power unit that is placed, for example, along the edge of a driveway, similar to a gate, or a scissors elevator door. The solar power unit opens, folds, collapses, or rotates so that traffic can pass through the driveway. Opening happens when objects approach or in response to cloud controlled events, as further described herein. An example of a pivoting solar power unit is illustrated in FIG. 2.

In another embodiment, the solar power units can self-navigate utilizing sensors and/or GPS to move from point A to point B, such as to move in and out of storage, to detect and move to areas of optimal sunlight collection, and to move out of the way of incoming objects such as cars. In the self-navigating embodiment, the user may set the area the solar power units can operate in. For example, the user may set the boundaries of the user's property. The user may further establish various rules for zones within the set boundaries. For example, the solar power units may not be permitted on certain parts of the property.

Embodiments of the present disclosure include a solar power unit capable of autonomous deployment and/or redeployment. The solar power unit may be configured to self-expand to increase the surface area of its solar panels to collect sunlight for electricity generation. For example, the solar power unit may include a motor to fold and unfold one or more solar panels, similar to a scissor-style elevator door. In some embodiments, the solar power unit may also be configured to self-propel from one location to another. For example, the solar power unit may include electric motors that enable it to move from a user's garage to his driveway once the user has left for work, and then back into the garage after the sun goes down or in response to the user returning home. In some embodiments, the solar power unit is configured to transmit energy to another device and/or to the grid as the energy is being generated.

For example, the solar power unit may be configured to wirelessly transmit power back to a base station. The base station may be configured to collect, store, and transmit power generated by the solar power unit, as well as to charge the solar power unit. The solar power unit may also be configured to wirelessly transmit power to another solar power unit. This may be useful if, for example, a solar power unit runs out of battery while deployed and is unable to generate enough energy to return to its own base station. Additionally, or alternatively, the solar power unit may include energy storage devices that enable the solar power unit to store the generated energy for later use. For example, the solar power unit may have one or more batteries or capacitors that allow it to store the generated electricity. These power storage devices may be swappable. For example, after fully charging a battery, the battery may be swapped out (e.g., at a base station) with an uncharged battery.

In some embodiments, wireless power transmission between a base station and a solar power unit may be used to return an otherwise stranded solar power unit to the base station. For example, if the solar power unit in the field does not have enough charge to return to base, the base station can use wireless power transmission to recharge a dead battery remotely. This may be done, for example, via an infrared transmitter/receiver combination.

In some embodiments, the solar power unit is configured to self-navigate from one location to another. For example, upon determining that the solar power unit is in the shadow of a tree, the solar power unit may automatically navigate to a new location where it can continue generating electricity. The solar power unit may self-navigate using any suitable technology. For example, the solar power unit may utilize a user-defined map in conjunction with one or more sensors (e.g., GPS sensors, sonic object detection sensors, etc.) to navigate from one location to another. In some embodiments, the solar power unit may utilize self-mapping technology, such as "line follower" algorithms in conjunction with sonic object detection or image analysis techniques, to navigate from one location to another.

Some embodiments of the present disclosure include a solar power unit that is capable of sensing incoming objects. For example, the solar power unit may include an object detecting camera or a sonic sensor. In some embodiments, the solar power unit may be communicatively coupled to a remote camera or sonic sensor (e.g., mounted at the end of a driveway) to detect incoming vehicles or persons. In response to detecting an incoming object, the solar power unit may be configured to redeploy. Redeploying may include moving to another location (e.g., move to a lawn so that a vehicle can enter the driveway), and/or undeploying (e.g., retracting to take up less space).

In some embodiments, the solar power unit is connected to one or more remote computers (e.g., in the cloud). The solar power unit may be configured to retrieve information from the cloud to determine when the solar power unit should redeploy. For example, the user may upload a deploy/store schedule to a cloud device. Using the deploy/store schedule, the solar power unit may determine when the user plans to return home, and it may begin retracts shortly before then (e.g., 10 minutes earlier) so that it is fully retracted upon the arrival of the user. In some embodiments, the solar power unit may receive GPS coordinates for the user's vehicle and automatically self-store when the user is approaching (e.g., auto start storage when homeowner gets within 2 miles of residence). The solar power unit may further include sensors/transmitters that enable it to interact with other devices. For example, the solar power unit may include a transmitter that allows it to open and close the garage door.

Some embodiments of the present disclosure include a solar power unit that can self-adjust for optimal sun exposure throughout the day. The solar power unit may have a camera to inspect shading of driveway and itself, and move within a preset allowed area to maximize energy production. For example, the solar power unit may determine that at 3 PM, a tree casts shade over 25% of the driveway. Accordingly, the solar power unit may move to a nonshaded spot of the driveway at that time. In some embodiments, the solar power unit may monitor a weather service to determine at which locations it will generate the most electricity.

In some embodiments, two or more solar power units can operate completely independent of each other. For example, in the instances where the solar power units can self-navigate, each solar power unit will detect an available space within the allowable/deployment area(s). Each solar power unit may either use its sensors to find an available space within the boundaries, or it may navigate to a user-determined spot for that particular solar power unit.

In some embodiments, two or more solar power units can interact and self-organize. For example, each unit may have common knowledge of allowed deployment areas, and they can communicate with each other to achieve intended site deployment and storage. Knowledge of available deployment areas may be provided to the solar power units by a user. Alternatively, knowledge of available deployment areas may be provided by one of the solar power units. In some embodiments, self-organizing includes establishing a priority. For example, if a first solar power unit determines that it needs to redeploy to an area before a second solar power unit, the first solar power unit may be considered the first-in-line. Accordingly, the second solar power unit must wait until the first solar power unit moves to its deployment location. Upon reaching the deployment location, the first solar power unit may transmit a signal to the second solar power unit, causing the second solar power unit to move into its position.

In some embodiments, the solar power units may all move as a swarm instead of sequentially. Each solar power unit may determine where it (and, in some embodiments, the other units) are relocating to, and begin moving towards that area. The use of proximity sensors and vehicle-to-vehicle communications between the solar power units can prevent collisions between solar power units during relocation. The solar power units may be configured to communicate with one another to negotiate alternative paths and/or relocation orders (e.g., which solar power unit moves first) in the event that two solar power units are attempting to occupy the same area, which would otherwise lead to a collision.

In some embodiments, one of the solar power units acts as a primary solar power unit. The primary solar power unit may be responsible for generating a redeployment plan that instructs one or more other solar power units where and when they should deploy. The solar power unit that acts as the primary solar power unit may be chosen in numerous ways. For example, and without limitation, the primary solar power unit may be the first unit to determine that it needs to redeploy, the first unit to arrive at a particular location, a user-selected unit, and/or the solar power unit that generates the most electricity and/or is most efficient. Once selected, the primary solar power unit may coordinate the redeployment of all solar power units in the autonomous solar power system.

It is to be understood that the aforementioned advantages are example advantages and should not be construed as limiting. Embodiments of the present disclosure can contain all, some, or none of the aforementioned advantages while remaining within the spirit and scope of the present disclosure.

Turning now to the figures, FIG. 1 illustrates a block diagram of an example autonomous solar power system 100, in accordance with embodiments of the present disclosure. The example autonomous solar power system 100 includes a first solar power unit 102, a second solar power unit 104, one or more remote sensors 106, a remote data system 108, and a user device 140.

Consistent with various embodiments, the solar power unit 102 may include, and the remote user device 140 may be, a computer system. For example, in some embodiments the remote user device 140 is a mobile telephone (e.g., a smartphone). The solar power unit 102 and the remote user device 140 may include one or more processors/controllers 112, 142 and one or more memories 120, 144 respectively.

The solar power unit 102, the second solar power unit, the remote sensors 106, the remote data system 108, and the remote user device 140 may be configured to communicate with each other. For example, the solar power unit 102 and the remote user device 140 may communicate through an internal or external network interface 118, 148. The network interfaces 118, 148 may be, e.g., modems or network interface cards. For example, the network interfaces 118, 148 may enable the solar power unit 102 and the remote user device 140 to communicate with each other using a direct communication channel (e.g., Bluetooth) or via a network (e.g., network 150). Similarly, the solar power unit 102 may be configured to communicate with the second solar power unit 104, the remote sensors 106, and/or the remote data system 108 using a direct communication channel and/or via a network.

The solar power unit 102, the second solar power unit 104, the remote sensors 106, the remote data system 108, and/or the remote user device 140 may be equipped with a display or monitor. Additionally, the solar power unit 102, the second solar power unit 104, the remote sensors 106, the remote data system 108, and/or the remote user device 140 may include optional input devices (e.g., a keyboard, mouse, scanner, or other input device), and/or any commercially available or custom software (e.g., browser software, communications software, server software, natural language processing software, search engine and/or web crawling software, filter modules for filtering content based upon predefined parameters, etc.). In some embodiments, the remote user device 140 and/or the remote data system 108 may be a server, desktop computer, laptop computer, or hand-held device.

The solar power unit 102, the second solar power unit 104, the remote sensors 106, the remote data system 108, and/or the remote user device 140 may be distant from each other and communicate over a network 150. In some embodiments, the solar power unit 102 may act as a central hub from which remote devices 140 and/or one or more other devices (e.g., the remote sensors 106, the second solar power unit 104, etc.) can establish a communication connection, such as in a client-server networking model. Alternatively, the solar power unit 102, the second solar power unit 104, the remote sensors 106, the remote data system 108, and/or the remote user device 140 may be configured in any other suitable networking relationship (e.g., in a peer-to-peer configuration or using any other network topology).

In some embodiments, the network 150 can be implemented using any number of any suitable communications media. For example, the network 150 may be a wide area network (WAN), a local area network (LAN), an internet, or an intranet. In certain embodiments, one or more of solar power unit 102, the second solar power unit 104, the remote sensors 106, the remote data system 108, and/or the remote user device 140 may be local to each other, and communicate via any appropriate local communication medium. For example, the remote solar power unit 102 and the remote sensors 106 may communicate using a local area network (LAN), one or more hardwire connections, a wireless link or router, or an intranet. In some embodiments, solar power unit 102, the second solar power unit 104, the remote sensors 106, the remote data system 108, and/or the remote user device 140 may be communicatively coupled using a combination of one or more networks and/or one or more local connections. For example, the remote sensors 106 may be hardwired to the solar power unit 102 (e.g., connected with an Ethernet cable) while the remote user device 140 may communicate with the host device using the network 150 (e.g., over the Internet).

In some embodiments, the network 150 may be a telecommunication network. The telecommunication network may include one or more cellular communication towers, which may be a fixed-location transceiver that wirelessly communicates directly with a mobile communication terminal (e.g., remote user device 140). The wireless communications links may include, for example, shortwave, high frequency, ultra-high frequency, microwave, wireless fidelity (Wi-Fi), Bluetooth technology, global system for mobile communications (GSM), code division multiple access (CDMA), second-generation (2G), third-generation (3G), fourth-generation (4G), fifth-generation (5G), or any other wireless communication technology or standard to establish a wireless communications link.

In some embodiments, the network 150 can be implemented within a cloud computing environment, or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 150.

The solar power unit 102 includes one or more controllers 112 (e.g., processors), one or more sensors 114, a GPS module 116, a network interface 118, a memory 120, one or more solar cells 130, a power storage/transmission device 132, one or more deployment mechanisms 134, and one or more movement mechanisms 136. The controllers 112 may be configured to execute program instructions to perform one or more of the method described herein (e.g., methods 400, 500, and 600). For example, the controllers 112 may be configured to identify an upcoming redeployment event, determine a suitable place to redeploy the solar power unit 102, and effectuate redeployment of the solar power unit 102 at the suitable location.

The sensors 114 may include any number of sensors to enable and/or assist in deployment of the solar power unit 102 and/or detection of a redeployment event. For example, the sensors 114 may include proximity sensors (e.g., LIDAR) that enable the solar power unit 102 to autonomously move between locations without crashing other otherwise hitting obstacles. In some embodiments, the sensors 114 include sensors for detecting an upcoming redeployment event. For example, the sensors 114 may include an image sensing device (e.g., a camera) that can detect changes in the weather that may affect the ability of the solar power unit 102 to generate power. Additionally, the camera may be utilized to determine that the solar power unit 102 needs to deploy, undeploy, and/or move. For example, if the solar power unit 102 is deployed across a user's driveway, the camera may capture images showing the user's car approaching the driveway, and the solar power unit 102 may automatically retract, allowing the user to park the user's car on the driveway. In some embodiments, the sensors 114 may include, but are not limited to, light sensors, temperature sensors, humidity sensors, navigation sensors (e.g., a compass), and/or voltage/current sensors (e.g., for measuring the amount of power being generated).

The GPS module 116 is configured to determine a location of the solar power unit 102 using satellite navigation. Any suitable satellite navigation technology may be used, including, without limitation, the global positioning system (GPS), the GLObal NAvigation Satellite System (GLONASS), the BeiDou Navigation Satellite System (BDS), the Galileo navigation system, and/or any other satellite navigation system. In some embodiments, the GPS module 116 can use a combination of multiple satellite navigation technologies to determine a location of the solar power unit 102. In some embodiments, the solar power unit 102 may utilize one or more other location detection devices in addition to, or instead of, the GPS module 116. For example, the solar power unit 102 may utilize location beacons places at or around the area that the solar power unit 102 is to operate, and the solar power unit 102 may utilize these location beacons to determine its location. As would be understood by a person of ordinary skill in the art, any type or combination of location identification technologies that are not otherwise inconsistent with the present disclosure may be utilized.

The one or more solar cells 130, also known as photovoltaic cells, are electrical devices that convert light energy directly into electricity by the photovoltaic effect. The one or more solar cells 130 can be grouped into one or more modules, often referred to as solar panels. Each solar cell 130 (or solar panels) may include wiring that transmits the generated electrical power to a power storage/transmission device 132. The power storage/transmission device 132 may enable the power generated by the solar cells 130 to be transmitted to another location (e.g., to a house or other electricity consuming device/entity, directly to the grid) using one or more wires. Additionally, or alternatively, the power storage/transmission device 132 may include power storage devices (e.g., batteries, capacitors, supercapacitor, etc.) that retain the generated electrical power. In embodiments utilizing power storage devices, the solar power unit 102 may include an outlet that allows the stored energy to be delivered to another device or to the grid at a later time.

The one or more deployment mechanisms 134 are mechanisms that enable the solar power unit 102 to change from a deployed state to an undeployed state and/or vice versa. Any suitable deployment mechanism may be utilized. For example, in some embodiments the solar power unit 102 uses a scissors system that allows the solar power unit 102 to open or close, as shown in FIG. 2. In these embodiments, the deployment mechanisms 134 may include one or more hinges and motors that enable deployment of the solar panels. While the use of a scissors system is described herein, this is for illustrative purposes only. Any deployment system (e.g., folding, pivoting, etc.) otherwise consistent with this disclosure is contemplated.

The one or more movement mechanisms 136 enable the solar power unit 102 to relocate from a first location to a second location. For example, the one or more movement mechanisms may include a plurality of wheels or treads connected to one more axles and a motor (e.g., an electric motor) and drivetrain to drive the wheels. In other embodiments, the movement mechanisms 136 may generate aerodynamic lift to enable the solar power unit 102 to fly from one location to another (e.g., using a helicopter or drone style rotor system). While examples of movement mechanisms are described herein, any suitable system for enabling relocation of the solar power unit 102 (e.g., a rail-style system) not otherwise inconsistent with this disclosure is contemplated.

The memory 120 includes a deployment application 122, one or more maps 124, and a schedule 126. The deployment application 122 includes one or more modules (e.g., made up of program code/instructions) that cause the controllers 112 to perform the methods described herein. For example, the deployment application 122 may include program instructions that cause the controllers 112 to monitor for a redeployment event, determine a new location for the solar power unit 102 once a redeployment event is detected, and send control signals to the deployment mechanisms 134 and/or the movement mechanisms 136 to relocate the solar power unit 102.

The maps 124 include one or more maps detailing locations where the solar power unit 102 is, and is not, permitted to go. For example, the maps 124 may define, via geographic coordinates and/or proximity to beacons, locations where the solar power unit 102 is permitted to deploy (referred to herein as deployment zones/areas), locations where the solar power unit 102 is permitted to traverse, but is not permitted to stop and/or deploy (referred to herein as travel zones/areas), and locations where the solar power unit 102 is not permitted to be (referred to herein as restricted zones/areas). An example map is described with respect to FIG. 3.

The maps 124 may be defined by a user, and they may be used in conjunction with a schedule 126, which establishes when the solar power unit 102 is to be deployed, when it is to relocate, and when it is to undeploy (e.g., for storage or safekeeping). The schedule 126 may be set by a user, or it may be automatically determined by the controllers 112. For example, the controllers 112 may consider events such as the weather and/or calendaring events retrieved from one or more user calendars (e.g., when the user(s) will be coming/leaving home) to generate the schedule 126. The controllers 112 may also analyze posts made by the user and/or related users on a social network to generate the schedule 126 and/or detect an upcoming redeployment event.

The remote user device 140 includes a processor 142, a memory 144, a GPS module 146, and a network interface 148. As discussed herein, the remote user device 140 may be configured to communicate with the solar power unit 102 via a network 150. The remote user device 140 may send data to the solar power unit 102 regarding upcoming redeployment events. For example, the remote user device 140 may send location information for the user, collected using the GPS module 146, to the solar power unit 102. The solar power unit 102 may receive the location data of the user, and based on the location data, may determine when the user will arrive home (e.g., based on the user's current location and movement speed, based on an ETA sent by the remote user device 140 utilizing a navigation application, etc.). The solar power unit 102 may ensure that it is in a proper location (e.g., not blocking a driveway) by the time the user gets home.

The remote sensors 106 includes any sensors communicatively coupled to, but not disposed on, the solar power unit 102. The sensor may include Internet of Things (IoT) devices, such as IoT cameras. The remote sensors 106 may collect data that is used by the solar power unit 102 to detect a redeployment event, determine a new location to relocate to, or move to the new location. For example, the remote sensors 106 may be light sensors (e.g., photoresistors, photodiodes, phototransistors, etc.) that can detect ambient light. In these embodiments, the remote sensors 106 may transmit the current light levels to the solar power unit 102 so that the solar power unit 102 can select a new location with the highest current light levels.

The remote data system 108 is a computer system that includes data that may be used by the solar power unit 102 to detect a redeployment event, determine a new location to relocate to, or move to the new location. For example, the remote data system 108 may be a cloud server that includes one or more maps (e.g., the maps 124). In other embodiments, the remote data system 108 may include data pertaining to the user, such as an expected time home or other calendaring information. In some embodiments, the remote data system 108 is a weather service, which the solar power unit 102 may use to determine whether upcoming weather events (e.g., a storm) require relocation of the solar power unit 102 (e.g., to a location that has less cloud cover so that more electricity can be generated, or to a safe location in the event of a potentially damaging storm entering the area).

While FIG. 1 illustrates an autonomous solar power system 100 with a single remote user device 140 and two solar power units 102, 104, suitable computing environments for implementing embodiments of this disclosure may include any number of remote user devices and solar power units. The various models, modules, systems, and components illustrated in FIG. 1 may exist, if at all, across a plurality of host devices and remote devices.

It is noted that FIG. 1 is intended to depict the representative major components of an exemplary autonomous solar power system 100. In some embodiments, however, individual components may have greater or lesser complexity than as represented in FIG. 1, components other than or in addition to those shown in FIG. 1 may be present, and the number, type, and configuration of such components may vary.

Referring now to FIG. 2, illustrated is an example use case of solar power units, in accordance with embodiments of the present disclosure. In the illustrated example, a first solar power unit 201 is in a deployed state, while a second solar power unit 202 is in an undeployed state. In the example embodiment depicted in FIG. 2, the solar power units are disposed along an edge of a user's driveway 205. When deployed, the solar power units unfold across the driveway, thereby blocking the user's access to the garage 210. The solar power units 201, 202 include solar panels 215 made up of a plurality of solar cells to collect sunlight and convert it into electricity.

In some embodiments, the solar power units 201, 202 are communicatively coupled to each other and to a user device (e.g., a smartphone). The solar power units 201, 202 may be coupled via any networking interface, as described here. For example, the solar power units 201, 202 may be connected using a cellular network (e.g., 3G, 4G, LTE, 5G, etc.). In some embodiments, the solar power units 201, 202 are connected to the Internet via a wireless router (not shown), thereby allowing communication between the solar power units 201, 202 and the user device.

In some embodiments, the solar power units 201, 202 are configured to deploy (e.g., transition to a deployed state) after the user leaves the house (e.g., to go to work). Upon determining that the user is on the way home, the solar power units 201, 202 may automatically return to the undeployed state, allowing the user access to the driveway 205 and the garage 210. For example, the solar power units 201, 202 may determine that the user is on his way home automatically by analyzing location information of the user, by analyzing a schedule of the user, by analyzing social network posts of the user, and/or in response to the user indicating (e.g., using an app on the user device) that he is returning home. By predicting when the user will arrive, the solar power units 201, 202 may automatically retract shortly before the user's arrival, thereby generating electricity for as long as possible without causing the user to wait upon returning for the solar power units 201, 202 to clear the driveway.

In some embodiments, one or more sensors (e.g., a camera, not shown) may detect another vehicle attempting to enter the driveway 205. Upon detecting another vehicle approaching the driveway 205, the solar power units 201, 202 may retract, even though the vehicle does not belong to the user. For example, if the user's friend is coming to drop something off, the solar power units 201, 202 may retract, allowing the friend to use the driveway. Once the friend leaves, the solar power units 201, 202 may redeploy.

In the embodiment illustrated in FIG. 2, one of the solar power units 202 remains in the undeployed state. This may be in response to detecting that shade 220 from a tree is blocking the area where the solar power unit 202 would deploy into. By remaining in the undeployed state, the solar power unit 202 avoids unnecessarily wasting electricity by deploying when it would not be able to generate power due to the shade 220.

Figure 3:
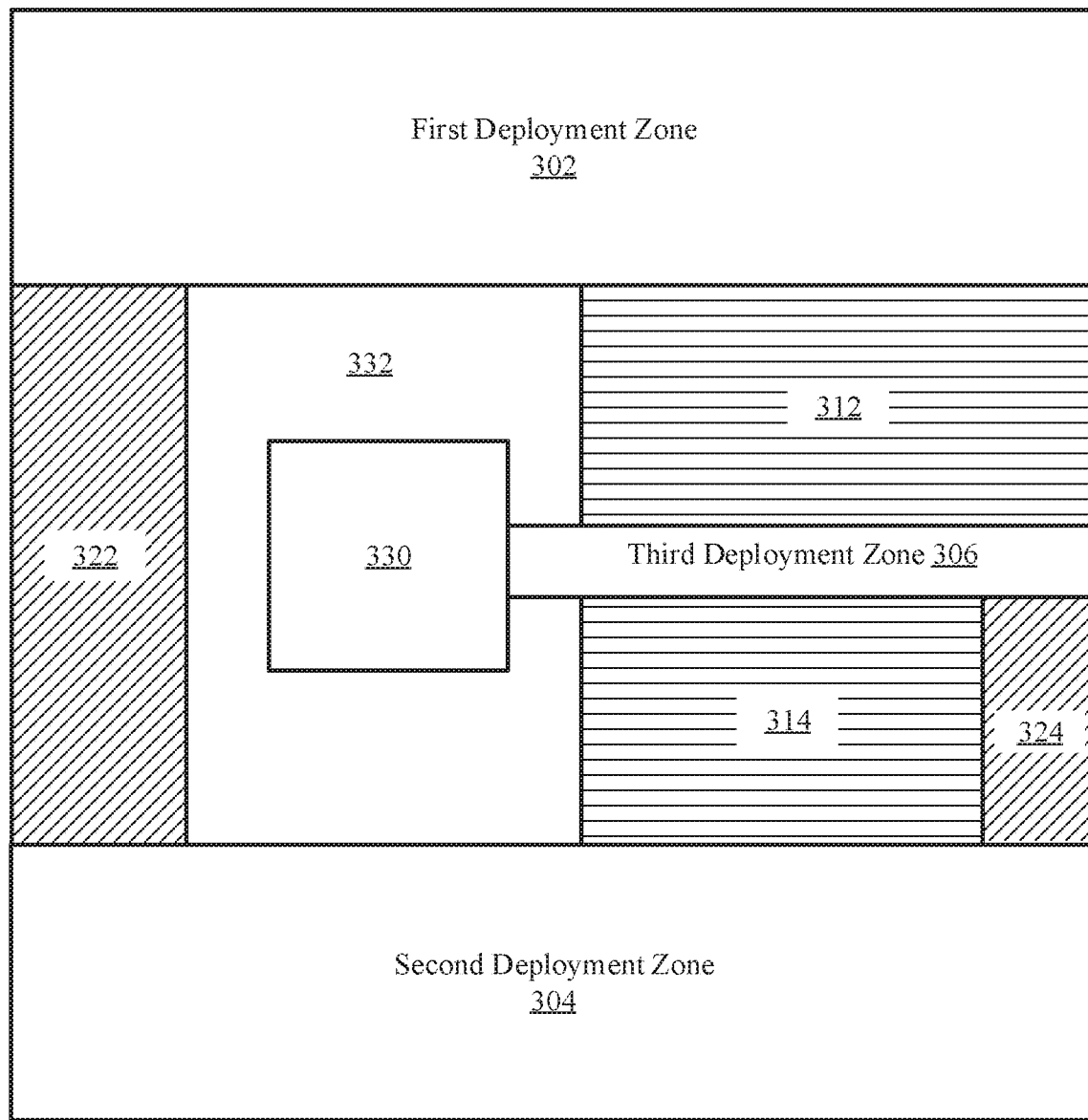
FIG. 3 illustrates an example deployment map for a solar power system, in accordance with embodiments of the present disclosure.

Referring now to FIG. 3, illustrated is an example deployment map 300 for an autonomous solar power system, in accordance with embodiments of the present disclosure. The map 300 includes a house 330 and four different types of zones: three deployment zones 302, 304, 306; two travel zones 322, 324; two restricted zones 312, 314; and a storage zone 332.

As described herein, the deployment zones 302, 304, and 306 are areas where the solar power unit is permitted to deploy and generate electricity. The restricted zones 312, 314 are areas where the solar power unit is not permitted to enter, even temporarily while moving to a new location. The travel zones 322, 324 are areas where the solar power unit is permitted to traverse (e.g., drive on), but on which it is not permitted to deploy. As shown in FIG. 3, each deployment zone 302, 304, 306 is connected to at least one other deployment zone via a travel zone 322, 324.

The storage zone 332 is an area where the solar power unit goes when it is being stored (e.g., at the end of the day). For example, once the solar intensity is below a threshold such that electricity generation is low, the solar power unit may undeploy and move to a location in the storage zone 332. In some embodiments, the storage zone 332 may offer protection from the elements. For example, the storage zone 332 may be inside of a building, such as in the garage or in a shed. Upon determining that potentially damaging weather (e.g., hail) is approaching, the solar power unit may automatically move to the storage zone 332 to protect it.

Figure 4:
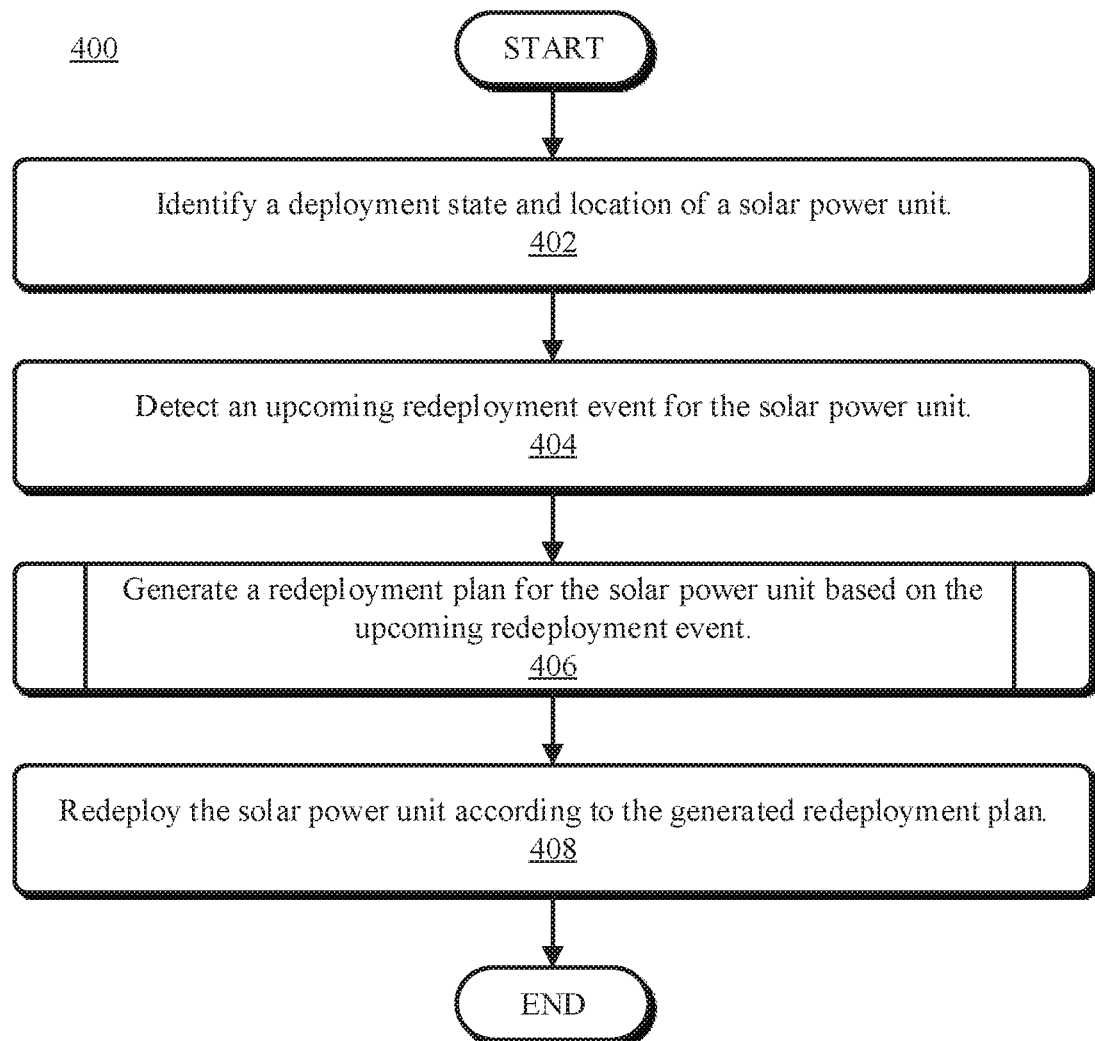
FIG. 4 illustrates a flowchart of an example method for redeploying a solar power unit in response to a redeployment event, in accordance with embodiments of the present disclosure.

Referring now to FIG. 4, illustrated is a flowchart of an example method 400 for redeploying a solar power unit in response to a redeployment event, in accordance with embodiments of the present disclosure. The method 400 may be performed by hardware, firmware, software executing on a processor, or any combination thereof. For example, the method 400 may be performed by one or more controllers (e.g., a processor) embedded in a solar power unit. The method 400 may begin at operation 402, wherein a deployment state and a location of a solar power unit is determined.

The deployment state of the solar power unit may include whether the solar power unit is currently deployed (e.g., such that it is collecting sunlight and generating electricity), partially deployed (e.g., where one or more solar panels are currently collecting sunlight, but additional panels are not), or undeployed (e.g., such that the solar power unit is not currently generating electricity). The location of the solar power unit may be its geographical location as determined by a GPS module of the solar power unit. In some embodiments, the location may indicate a zone (e.g., a deployment zone) where the solar power unit is at.

At operation 404, an upcoming redeployment event affecting the solar power unit is detected. As described herein, a redeployment event is any event that may cause the solar power unit to change its deployment state (e.g., from deployed to undeployed) or move to a new location. Examples of redeployment events include, without limitation, weather-related events (e.g., potentially damaging weather, weather that reduces solar intensity over a portion of the deployment zone, etc.) and user-related events (e.g., a user returning home or otherwise needing the space occupied by the solar power unit, an unexpected guest arriving).

As described herein, a solar power unit may detect an upcoming redeployment event in numerous ways. For example, the solar power unit may analyze its environment using sensors (e.g., light sensors, a camera, etc.) to determine that it is currently, or will soon be, in a shaded area. As another example, the solar power unit may retrieve data from a cloud server. The retrieved data may indicate when a user plans to arrive home (e.g., based on the user's calendar or location information for the user). As yet another example, the solar power unit may monitor one or more remote data services, such as weather services, for indications of redeployment events.

At operation 406, a redeployment plan may be generated for the solar power unit. The redeployment plan establishes one or more actions that the solar power unit will perform in response to detecting the redeployment event. For example, the redeployment plan may include a new location for the solar power unit, a time when the solar power unit is going to redeploy to the new location, and a path that the solar power unit will travel to get to the new location. The path may be generated through analysis of a map (e.g., such as the map shown in FIG. 3) using a pathfinding and/or maze-solving algorithm to connect the start position and the ending position. In some embodiments, such as those where the redeployment plan includes multiple solar power units, paths may be generated for each solar power unit. Example pathfinding algorithms that may be employed include the Bellman-Ford algorithm, the A* algorithm and Dijkstra's algorithm.

Figure 5:
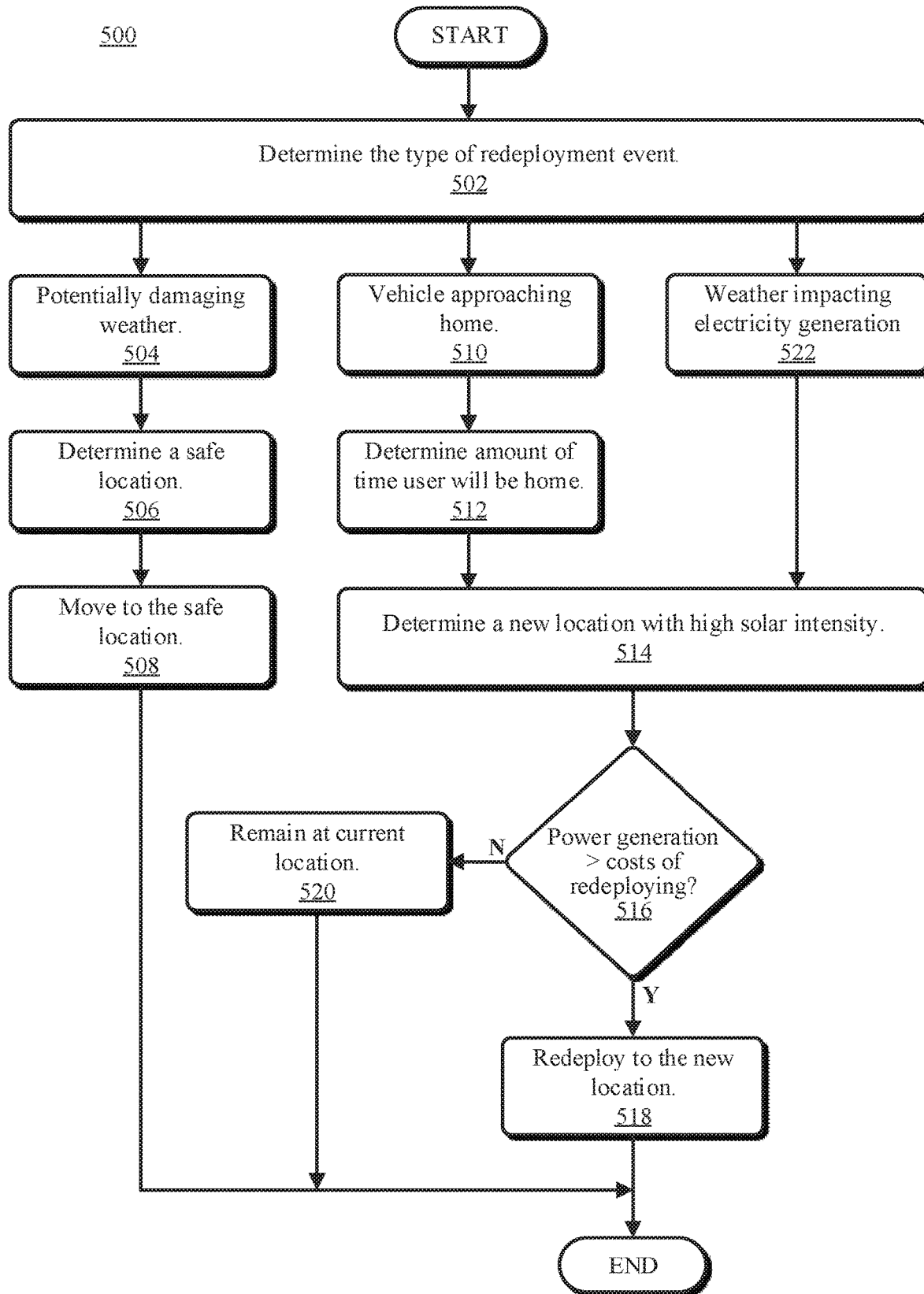
FIG. 5 illustrates a flowchart of an example method for generating a redeployment plan for a solar power unit based on a redeployment event, in accordance with embodiments of the present disclosure.

An example process for generating a redeployment plan based on the redeployment event is discussed in reference to FIG. 5.

At operation 408, the solar power unit is redeployed according to the redeployment play. A processor embedded on the solar power unit may cause the solar power unit to redeploy by sending control signals to one or more other components of the solar power unit. For example, the processor may send control signals to one or more motors to cause the motors to retract the solar panels in the event that the redeployment plan includes undeploying the solar power unit. As another example, the processor may send signals that cause the solar power unit to relocate to a new location, such as a storage location or another deployment location.

After redeploying the solar power unit at operation 408, the method 400 may end.

Referring now to FIG. 5, illustrated is a flowchart of an example method 500 for generating a redeployment plan for a solar power unit based on a redeployment event, in accordance with embodiments of the present disclosure. The method 500 may be performed by hardware, firmware, software executing on a processor, or any combination thereof. For example, the method 500 may be performed by one or more controllers (e.g., a processor) embedded in a solar power unit. The method 500 may begin at operation 502, wherein a type of redeployment event may be determined.

As described herein, the solar power units may be configured to respond to numerous types of redeployment events. Example redeployment events include potentially damaging weather (e.g., hail), an approaching vehicle or pedestrian that needs access to the area covered by the solar power unit, and weather events that affect electricity generation (e.g., clouds over parts of the deployment area).

If the redeployment event is potentially damaging weather (determined at operation 504), the solar power unit may determine a safe location at operation 506. The safe location may be a storage location established by a user. In some embodiments, the safe location may automatically be determined by the solar power unit. For example, if the solar power unit determines that it has begun to, or is going to, hail, the solar power unit may identify, using image analysis, a barn as providing cover for the solar power unit. Once a safe location is determined, the solar power unit may move to the safe location at operation 508, and the method 500 may end.

If the redeployment event is a vehicle approaching the home (determined at operation 510) and the solar power unit occupies a driveway, the solar power unit may determine a predicted amount of time that the vehicle will need access to the driveway at operation 512. The solar power unit may predict the amount of time based on, e.g., a user's calendar. The solar power unit may then determine one or more other locations with high solar intensity (e.g., above a threshold) where power generation may continue at operation 514.

At decision block 516, the solar power unit may determine whether the increased power generation at the new location is greater than the energy costs of redeploying. For example, if the user is only going to need the driveway for a few minutes, it may take more energy to relocate the solar power unit to the new location than will be generated by moving (e.g., because the downtime with waiting for the user to leave is low). On the other hand, if the user is going to need the driveway for the rest of the day, the energy costs associated with moving the solar power unit may be smaller than the increased amount of electricity generated by moving. As another example, if it is late in the day, the additional energy that would be generated may be lower (e.g., because the sun is going down) than the cost of moving the solar power unit.

If the solar power unit determines that the additional electricity generated by moving does not outweigh the costs at decision block 516, the solar power unit may undeploy and remain at the current location at operation 520, and the method 500 may end. In some embodiments, the solar power unit may redeploy at the current location once the vehicle leaves the area and the deployment zone is available. If the solar power unit determines that the additional electricity generated by moving does outweigh the costs at decision block 516, the solar power unit may redeploy to the new location at operation 518, and the method 500 may end.

Figure 6:
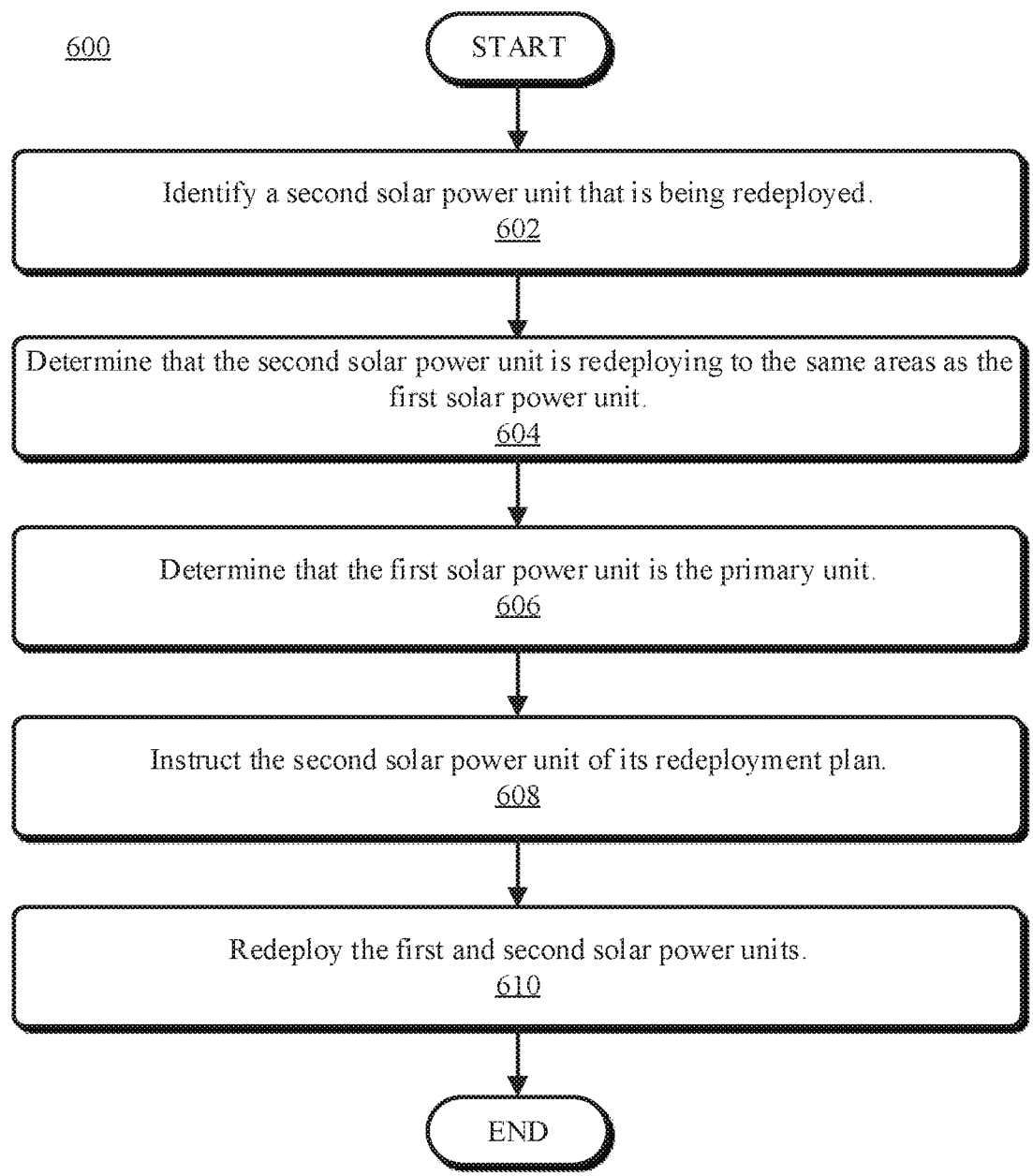
FIG. 6 illustrates a flowchart of an example method for coordination redeployment of two or more solar power units of an autonomous solar power system, in accordance with embodiments of the present disclosure.

Referring now to FIG. 6, illustrated is a flowchart of an example method 600 for coordination redeployment of two or more solar power units of an autonomous solar power system, in accordance with embodiments of the present disclosure. The method 600 may be performed by hardware, firmware, software executing on a processor, or any combination thereof. For example, the method 600 may be performed by one or more controllers (e.g., a processor) embedded in a first solar power unit. The method 600 may begin at operation 602, wherein a processor of a first solar power unit may identify a second solar power unit that is being redeployed.

As described herein, the first and second solar power units may be parts of a larger autonomous solar power system. The first and second solar power units may each have common knowledge of all components in the system. As such, detection of redeployment events may be centralized and/or distributed. In other words, in some embodiments, one of the solar power units is responsible for monitoring for redeployment events for all units in the system, whereas in other embodiments, every solar power unit is responsible for monitoring for redeployment events for just itself or for all solar power units. In other embodiments, the first and second solar power units may not have common knowledge, and they may share information with each other through inter-unit communications (e.g., over a network or through direct communication).

At operation 604, the first solar power unit may determine that the second solar power unit is being redeployed to the same area as the first solar power unit. This may be done in numerous ways. For example, in embodiments where all information is shared among the solar power units, when the second solar power unit detects a redeployment event affecting itself, it may pass that information on to other solar power units, including the first solar power unit. In other embodiments, the first solar power unit may be the unit that detected the redeployment event affecting the second solar power unit, and therefore it may have knowledge of the relocation. In still other embodiments, the first solar power unit may detect, though one or more sensors (e.g., a camera), that the second solar power unit is redeploying into the same location as the first solar power unit.

At operation 606, the first solar power unit may determine that it is the primary solar power unit. As used herein, the primary solar power unit may be responsible for directing other solar power units on how/when to relocate. For example, the primary solar power unit may be responsible for generating a redeployment plan that instructs one or more other solar power units where and when they should deploy. There are a number of ways that the first solar power unit may determine that it is the primary solar power unit. For example, and without limitation, the primary solar power unit may be the first unit to determine that it needs to redeploy, the first unit to arrive at a particular location, a user-selected unit, and/or the solar power unit that generates the most electricity and/or is most efficient.

Once identified as the primary solar power unit, the first solar power unit may coordinate the redeployment of all solar power units in the autonomous solar power system, including the second solar power unit, at operation 608. Coordinating the redeployment of the solar power units may include instructing the second solar power unit of its redeployment plan (e.g., where it is to be deployed, when it is to move to that location, and/or what path it should take to get there).

At operation 610, the first and second solar power units may redeploy to their new locations, and the method 600 may end.

Referring now to FIGS. 7A and 7B, illustrated is an example of an autonomous solar power system responding to a redeployment event, in accordance with embodiments of the present disclosure. The autonomous solar power system shown in FIGS. 7A and 7B includes two main components: a base station 712 and one or more solar power units 708. When the autonomous solar power system includes a plurality of solar power units 708, the solar power units 708 may be referred to as a swarm of solar power units 708. The base station 712 is a centralized location to store energy gathered by the solar power units 708. The base station 712 provides means for a solar power unit 708 to transfer collected energy to it. It can then feed the energy to a power grid, battery, or similar power sink.

In some embodiments, the base station 712 acts as a storage container of variable size depending on the swarm. It can receive charge from the swarm of solar power units 708 individually or in multitudes. The base station 712 also provides the ability to use local AC or DC power from its storage, as well as be hooked up to the local electrical grid or building power. This also powers the local network and orchestration system. The base station 712 may be mobile. This may be useful, for example, for loading and unloading itself. The base station 712 may also be equipped with solar panels to maximize the available surface area of the autonomous solar power system.

In some embodiments, the base station 712 is also configured to act as an orchestration unit for the autonomous solar power system. The base station 712 may receive data from the solar power units 708 and create a map of the local area. Using this information, combined with the motion detection of the solar power units 708, the base station 712 can send commands to one or more of the solar power units 708 to relocate themselves. This may allow the autonomous solar power system to deployed in low to medium traffic areas and provide solar collection while staying out of the way of vehicles or people.

The solar power units 708 are capable of moving about an area (e.g., via motorized wheels, tracks, airlifting, etc.). The top of the solar power units 708 include an adjustable tilt solar panel for converting sunlight into electricity. In some embodiments, the solar power units 708 can house a battery that it charges with the solar panel. In another embodiment, as power is produced it's transferred to another unit capable of storage (e.g., to the base station) via a power cord or inductive energy transfer. The solar power units 708 are capable of navigation to the centralized meeting point where the base station 712 is stored and giving surplus energy to an energy lake (large site battery or power grid).

Each solar power unit 708 may keep enough energy in venture out into the field again, as well as extra for some maintenance mobility purposes. In some embodiments, the solar power units 708 have multiple batteries: one to power the onboard the electronics, and another for power storage. In these embodiments, one or both batteries can be swapped at the base station 712.

The solar power units 708 may broadcast their position to the underlying network (e.g., to each other and/or to the base station 712) and can receive commands to adjust their location. The solar power units 708 may also contain sensors (such as infrared, sonar, and cameras) that allow them to send information about their surroundings to the centralized orchestration system.

The example shown in FIGS. 7A and 7B illustrate a solar power unit swarm (e.g., a plurality of solar power units 708) responding to a vehicle 706 approaching a user's property where the solar power swarm is deployed. The user's property is delineated by property lines 702, and it includes a parked vehicle 704, two shaded regions 710A, 710B, a base station 712, and the plurality of solar power units 708.

FIGS. 7A and 7B show the ability of the solar power units 708 to self-organize and move out of the way of traffic. The base station 712 may include, or be coupled to, a camera and a depth sensor. Using these sensors, the base station 712 can create a 34) topographical map of the local surroundings, including obstacles such as vehicles, trees, and curbs. Each solar power unit 708 may include a GPS location that it broadcasts to the base station 712 as well, increasing the accuracy of the map. Based on this map as well as the peak solar intake as measured by individual solar power units 708, the general location of where the swarm should be located is determined. When an object of large enough size is determined to be moving in the direction of the swarm, the base station 712 can send a move command to each solar power unit 708 in its swarm. The move command may include the target location to relocate to and a path to get there, as described herein.

FIG. 7A illustrates a first view 700A of the solar power unit swarm at a first point in time, as the incoming vehicle 706 is approaching the user's property. At this point in time, all of the solar power units 708 are in a deployed state and generating electricity. In other words, the solar power units 708 are all in areas with unobstructed access to sunlight.

As the vehicle 706 approaches the solar power units 708, the solar power units 708 vacate the area to allow the vehicle 706 to enter the property. This is illustrated in FIG. 7B, which shows a second view 700B of the property that occurs at a second point in time that is after the first point in time. Some of the solar power units 708, shown using dashed lines in FIG. 7B, leave their initial area and move to an obstructed area where electricity generation is slowed or halted. For example, some of the solar power units 708 may move under the parked vehicle 704, others may move into the two shaded regions 710A, 710B, and still others may return to the base station 712. Some of the solar power units 708 may remain in the path of the vehicle 706. These solar power units 708 may be configured to allow a vehicle to drive overtop of them without damage. Once the vehicle 706 departs the property, the solar power units 708 may return to their original location and continue generating power.

Figure 8B:
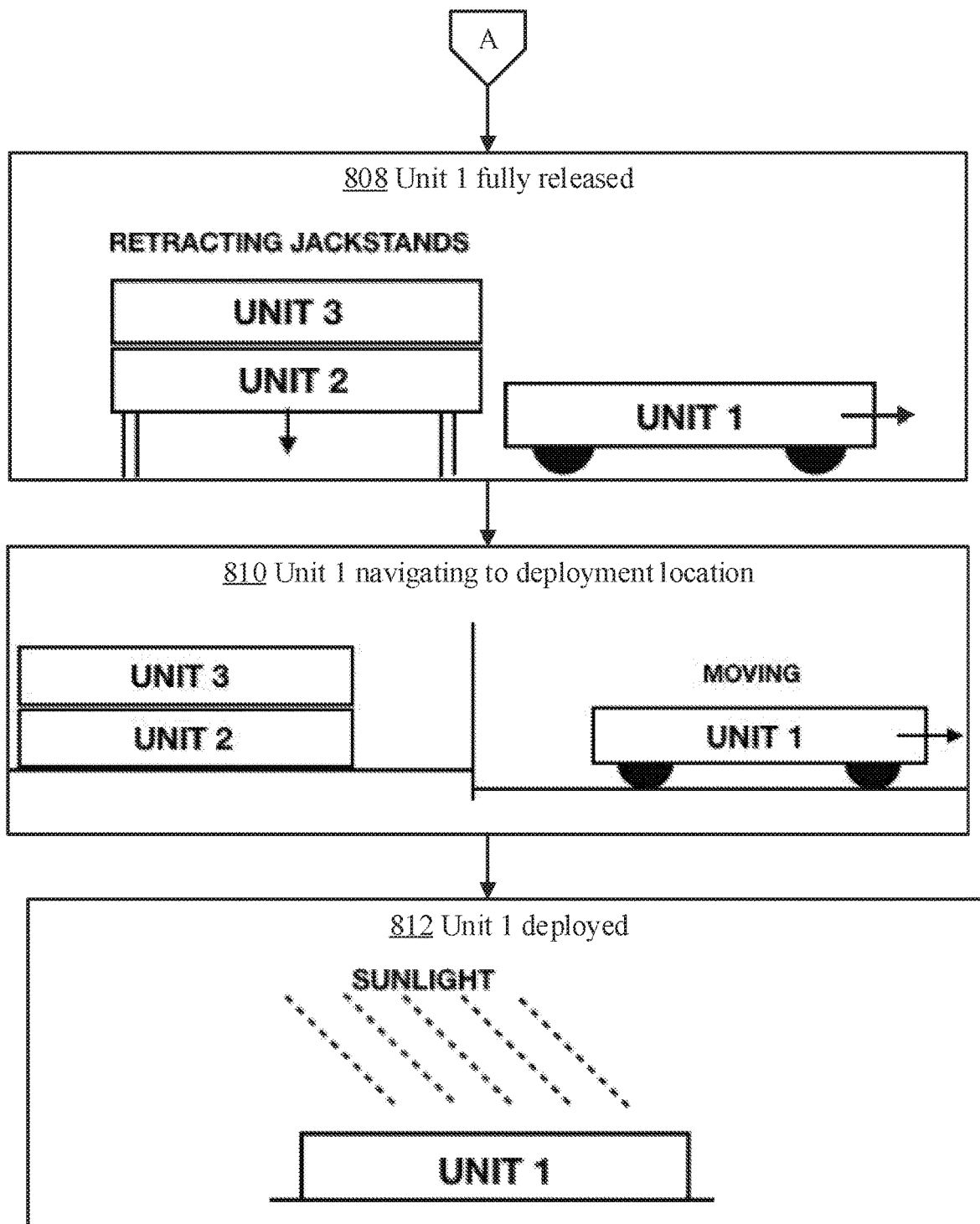

Referring now to FIGS. 8A and 8B, illustrated is a deployment sequence 800 for deploying stackable solar power units, in accordance with embodiments of the present disclosure. At operation 802, the autonomous solar power system may be deployed to a specific location. Initially, each of the solar power units (e.g., UNIT 1, UNIT 2, and UNIT 3) may be deployed in a stacked configuration for efficient storage.

At operation 804, the solar power units may start the autonomous deployment procedure. In the illustrated embodiments, a first unit (UNIT 1) lowers its wheels to gain ground clearance. After, or while, the first unit lowers its wheels, jack stands on a second unit (UNIT 2) may be extended at operation 806. The extended jack stands may ensure that the remaining stacked units (e.g., UNIT 2 and UNIT 3) can be supported without the first unit. Additionally, retracted (or partially retracted) wheels within the second unit may rotate in the opposite direction as the wheels of the first unit. The rotation of the retracted wheels may be passive (e.g., caused by the movement of the first unit) or active (e.g., powered rotation). Active rotation may provide an additional force on the first unit to help it get clear from the remaining units. Additionally, by partially extending the wheels of the second unit, the second unit may create additional contact points that help support the remaining stacked units while the first unit moves out.

At operation 808, after the first unit is fully released (e.g., no longer under the stack), the jack stands may be retracted, and the remaining units may be lowered to the ground. Meanwhile, at operation 810, the first unit may navigate to its deployment area and, at operation 812, become fully operational.

Figure 9A:
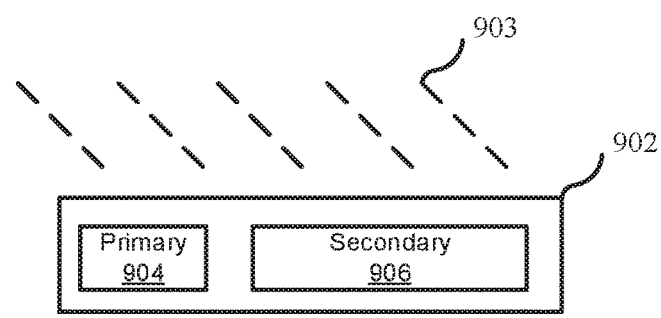
FIGS. 9A-9D illustrate various embodiments for transferring collected energy, in accordance with embodiments of the present disclosure.

Referring now to FIGS. 9A-9D, illustrated are various embodiments for transferring collected energy, in accordance with embodiments of the present disclosure. As illustrated in FIG. 9A, each solar power unit 902 has a solar panel on top that converts sunlight 903 into usable electric power. This power is stored in each individual solar power unit in one or more containment cells (e.g., batteries). For example, the solar power unit 902 depicted in FIG. 9A includes a primary battery 904 and a secondary battery 906, The primary battery 904 may provide power to the solar power unit 902, such as to move the unit and to power onboard electronics. The secondary battery 906 may provide energy storage for the generated electricity (e.g., to provide to a home or the grid).

Figure 9B:
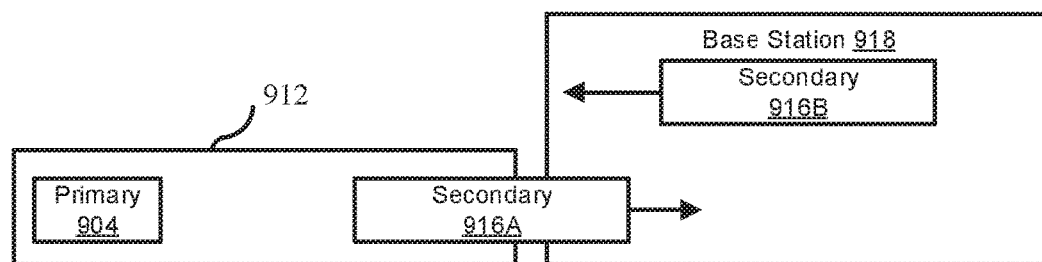

As shown in FIG. 9B, when at capacity, individual solar power units 912 may return energy to the base station 918 by swapping batteries. For example, the solar power unit 912 may fully charge an onboard secondary battery 916A. Once the onboard secondary battery 916A is fully charged, the solar power unit 912 may return to the base station 918, where the onboard secondary battery 916A may be swapped out for an empty secondary battery 916B.

Figure 9C:
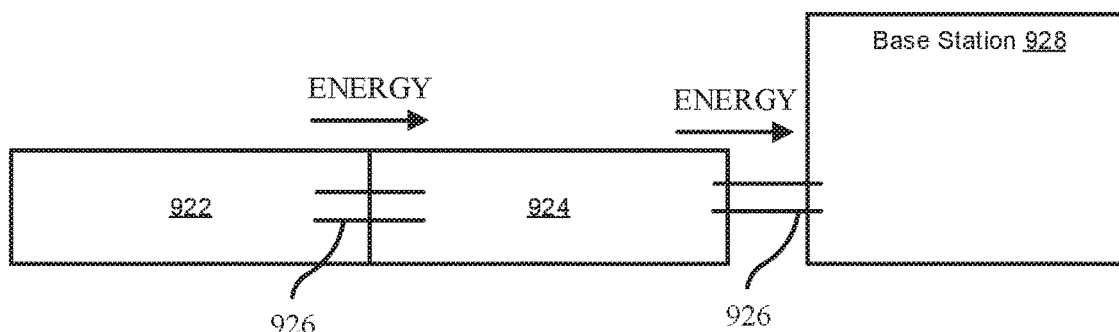

Referring now to FIG. 9C, shown is an example of solar power units 922, 924 transferring energy to each other and to a base station 928, in accordance with embodiments of the present disclosure. In some embodiments, the solar power units 922, 924 may include physical interconnects 926 (e.g., wires, plugs, etc.) which allow the solar power units 922, 924 to dock with (e.g., physically interconnect with) each other and with the base station 928. The solar power units 922, 924 may then transfer energy from one or more batteries (e.g., a second battery) to other devices. For example, a first solar power unit 922 may transfer energy to a second solar power unit 924. This may be done, for example, when the second solar power unit 924 has died and cannot return to the base station 928.

Figure 9D:
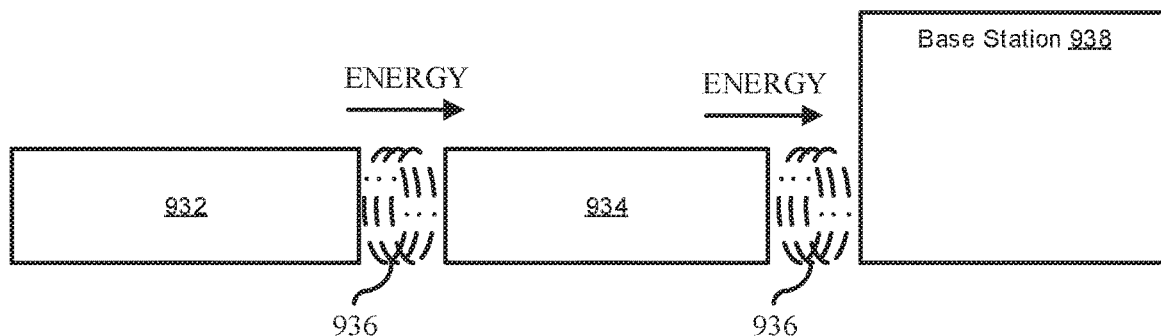

Referring now to FIG. 9D, shown is another example of solar power units 932, 934 transferring energy to each other and to a base station 938, in accordance with embodiments of the present disclosure. In the embodiment depicted in FIG. 9D, the solar power units 932, 934 may include wireless power transmission devices 936 (e.g., inductors) which allow the solar power units 932, 934 to transfer energy to each other and to the base station 938 without having to make a physical connection.

Figure 10:
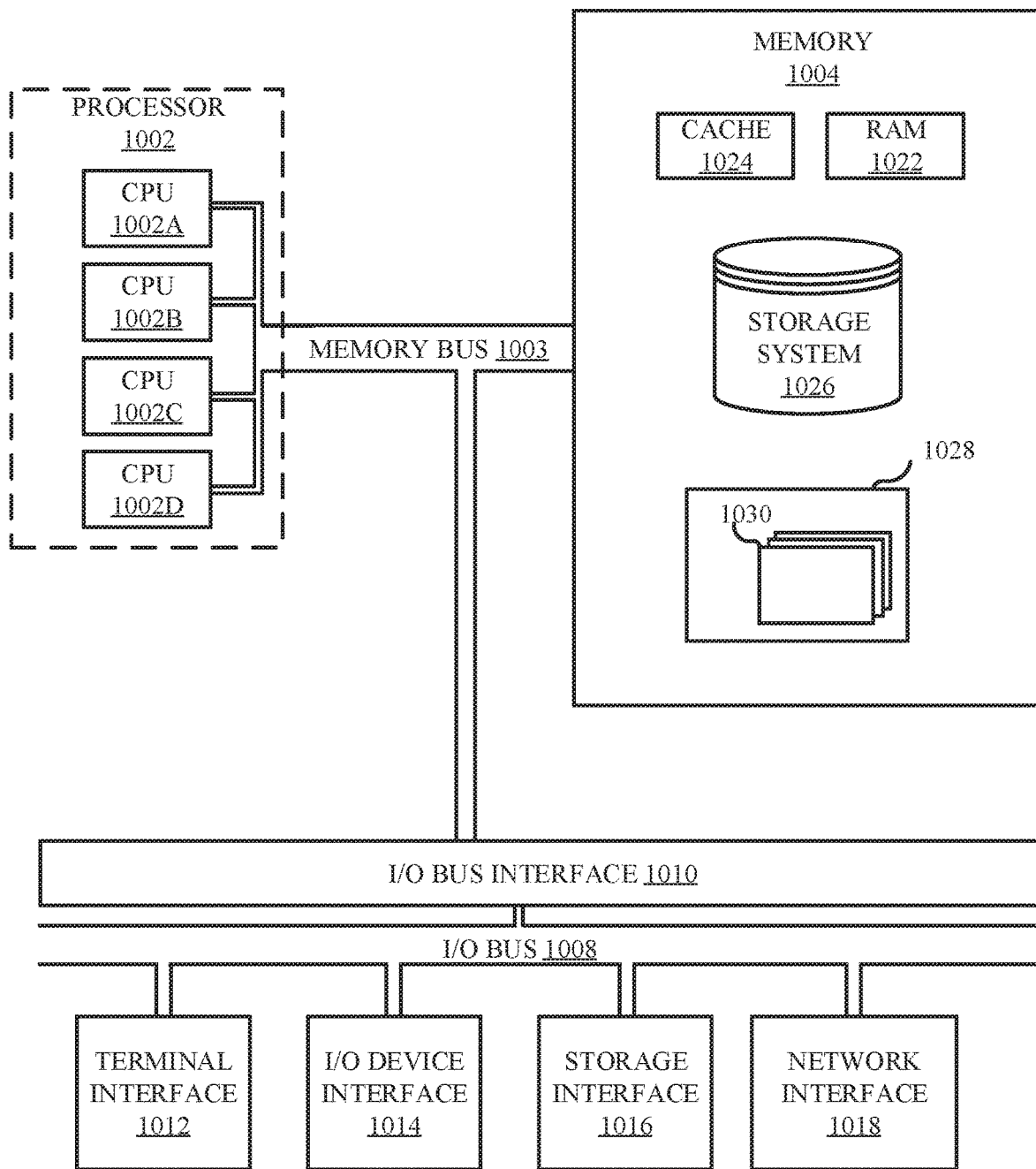
FIG. 10 illustrates a high-level block diagram of an example computer system that may be used in implementing one or more of the methods, tools, and modules, and any related functions, described herein, in accordance with embodiments of the present disclosure.

Referring now to FIG. 10, shown is a high-level block diagram of an example computer system 1001 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 1001 may comprise one or more CPUs 1002, a memory subsystem 1004, a terminal interface 1012, a storage interface 1016, an I/O (Input/Output) device interface 1014, and a network interface 1018, all of which may be communicatively coupled, directly or indirectly, for inter-component communication via a memory bus 1003, an I/O bus 1008, and an I/O bus interface unit 1010.

The computer system 1001 may contain one or more general-purpose programmable central processing units (CPUs) 1002A, 1002B, 1002C, and 1002D, herein generically referred to as the CPU 1002. In some embodiments, the computer system 1001 may contain multiple processors typical of a relatively large system; however, in other embodiments the computer system 1001 may alternatively be a single CPU system. Each CPU 1002 may execute instructions stored in the memory subsystem 1004 and may include one or more levels of onboard cache.

System memory 1004 may include computer system readable media in the form of volatile memory, such as random access memory (RAM) 1022 or cache memory 1024. Computer system 1001 may further include other removable/non-removable, volatile/non-volatile computer system storage media. By way of example only, storage system 1026 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 1004 can include flash memory, e.g., a flash memory stick drive or a flash drive. Memory devices can be connected to memory bus 1003 by one or more data media interfaces. The memory 1004 may include at least one program product having a set (e.g., at least one) of program modules that are configured to carry out the functions of various embodiments.

One or more programs/utilities 1028, each having at least one set of program modules 1030 may be stored in memory 1004. The programs/utilities 1028 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Program modules 1030 generally perform the functions or methodologies of various embodiments.

Although the memory bus 1003 is shown in FIG. 10 as a single bus structure providing a direct communication path among the CPUs 1002, the memory subsystem 1004, and the I/O bus interface 1010, the memory bus 1003 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1010 and the I/O bus 1008 are shown as single respective units, the computer system 1001 may, in some embodiments, contain multiple I/O bus interface units 1010, multiple I/O buses 1008, or both. Further, while multiple I/O interface units are shown, which separate the I/O bus 1008 from various communications paths running to the various I/O devices, in other embodiments some or all of the I/O devices may be connected directly to one or more system I/O buses.

In some embodiments, the computer system 1001 may be a multi-user mainframe computer system, a single-user system, or a server computer or similar device that has little or no direct user interface, but receives requests from other computer systems (clients). Further, in some embodiments, the computer system 1001 may be implemented as a desktop computer, portable computer, laptop or notebook computer, tablet computer, pocket computer, telephone, smart phone, network switches or routers, or any other appropriate type of electronic device.

It is noted that FIG. 10 is intended to depict the representative major components of an exemplary computer system 1001. In some embodiments, however, individual components may have greater or lesser complexity than as represented in FIG. 10, components other than or in addition to those shown in FIG. 10 may be present, and the number, type, and configuration of such components may vary.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 11:
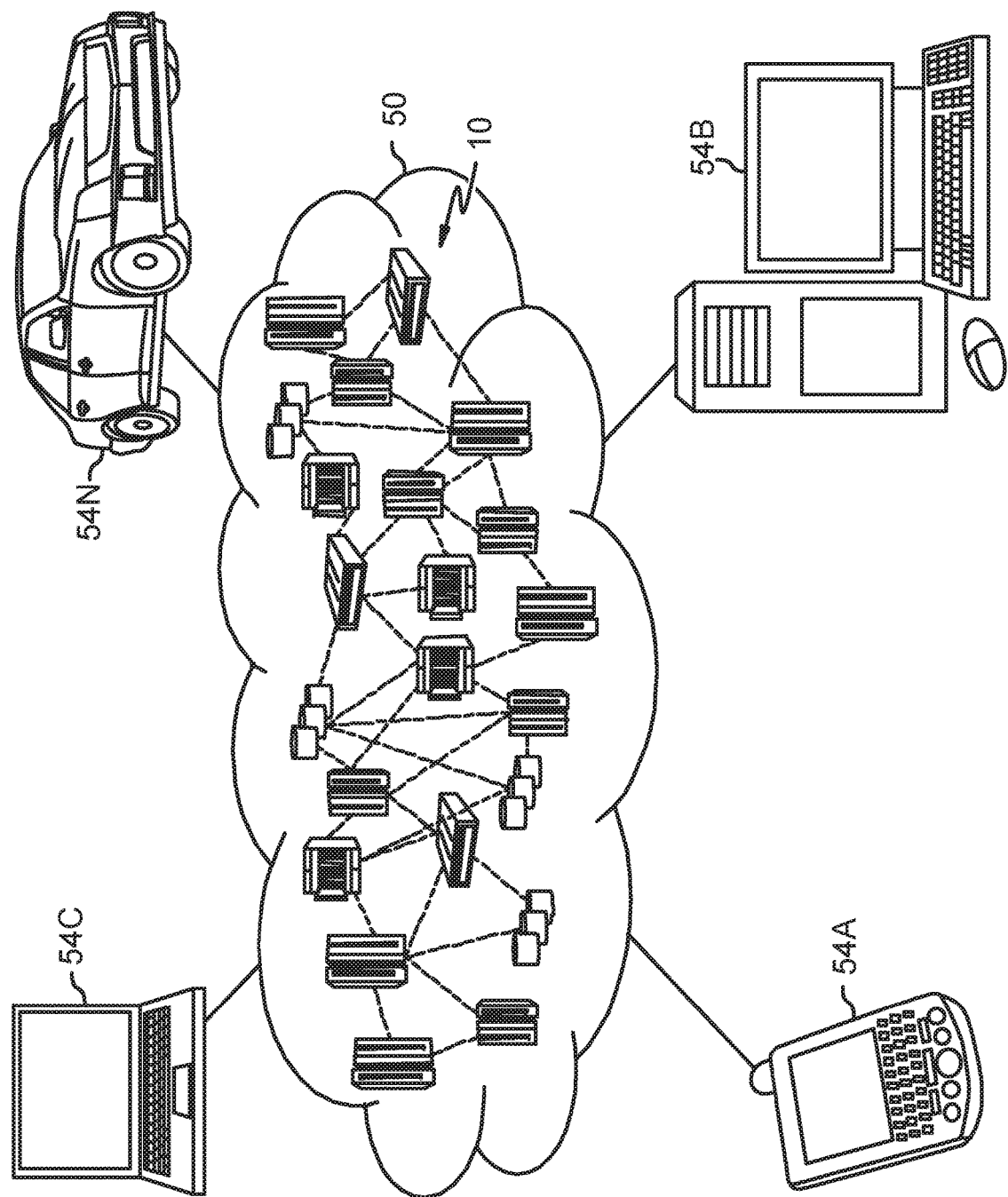
FIG. 11 depicts a cloud computing environment, in accordance with embodiments of the present disclosure.

Referring now to FIG. 11, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Figure 12:
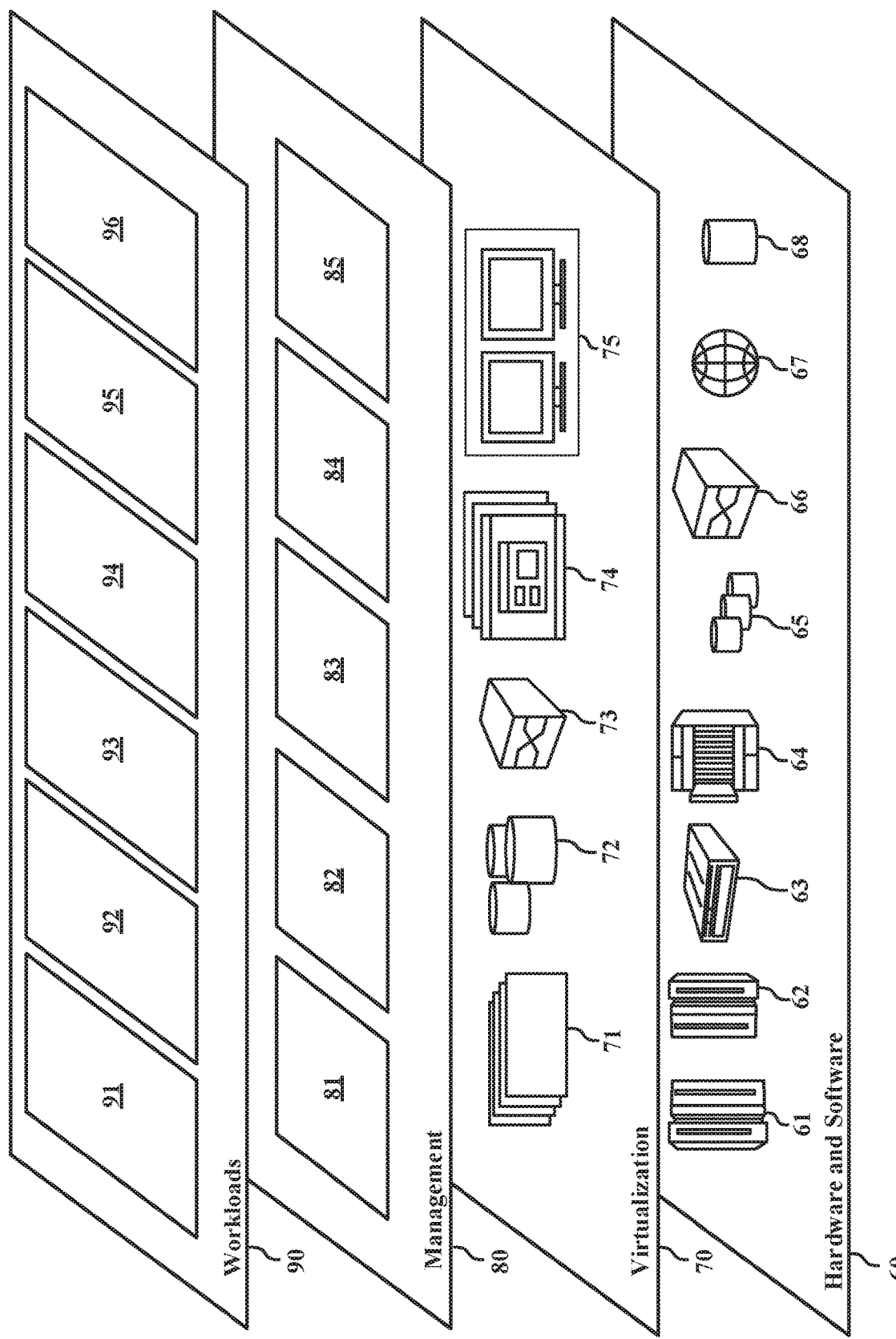
FIG. 12 depicts abstraction model layers, in accordance with embodiments of the present disclosure.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktops 96.

In addition to embodiments described above, other embodiments having fewer operational steps, more operational steps, or different operational steps are contemplated. Also, some embodiments may perform some or all of the above operational steps in a different order. Furthermore, multiple operations may occur at the same time or as an internal part of a larger process. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

As used herein, "a number of" when used with reference to items, means one or more items. For example, "a number of different types of networks" is one or more different types of networks.

When different reference numbers comprise a common number followed by differing letters (e.g., $100a$, $100b$, $100c$) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A method comprising:
   identifying a first location of a deployed solar power unit;
   detecting, by a processor, a redeployment event for the solar power unit at the first location;
   determining, by the processor and in response to the processor detecting the redeployment event for the solar power unit at the first location, a new location for the solar power unit;
   relocating the solar power unit to the new location;
   deploying one or more solar panels of the solar power unit at the new location, wherein the solar power unit is configured to generate electricity using the one or more solar panels and store the generated electricity in a power storage device of the solar power unit; and
   causing the solar power unit to return to a base station to provide power to one or more other devices that are electrically connected to the base station, the base station being configured to house a plurality of solar power units and to store energy received from the plurality of solar power units, wherein the solar power unit comprises one or more interconnecting plugs configured to dock and share the generated electricity with one or more other solar power units and with the base station.

2. The method of claim 1, wherein the redeployment event is a future event, and wherein the relocating the solar power unit to the new location occurs prior to the redeployment event.

3. The method of claim 2, wherein the redeployment event is a weather event that reduces solar intensity at the first location, and wherein determining the new location for the solar power unit comprises:
   identifying a first set of locations where the solar power unit is permitted to deploy;
   analyzing weather data for the first set of locations, wherein the weather data indicates a solar intensity at each location in the first set of locations at a time of the redeployment event; and
   selecting, as the new location, the location of the first set of locations having the highest solar intensity at the time of the redeployment event.

4. The method of claim 3, wherein identifying the first set of locations where the solar power unit is permitted to deploy includes utilizing a map that includes the first set of locations and a second set of locations, wherein the solar power unit is not permitted to deploy at the second set of locations.

5. The method of claim 4, wherein the map further includes a third set of locations, wherein the solar power unit is not allowed to deploy at a location in the third set of locations, but it is permitted to traverse through the third set of locations, and wherein relocating the solar power unit to the new location prior to occurrence of the redeployment event comprises:
   generating, by the processor, a path between the first location and the new location, wherein the path crosses at least one location in the third set of locations, and wherein the path does not cross a location in the second set of locations.

6. The method of claim 5, wherein generating the path comprises utilizing a pathfinding algorithm selected from the group consisting of the Bellman-Ford algorithm, the A* algorithm and Dijkstra's algorithm.

7. The method of claim 1, wherein a second solar power unit is relocating to the new location, the method further comprising:
   determining a combined area of the solar power unit and the second solar power unit when the solar power unit and the second solar power unit are in a deployed state;
   determining an area of the new location;
   determining, by comparing the combined area and the area, that both the solar power unit and the second solar power unit can deploy at the new location; and
   transmitting, by the processor, instructions to the second solar power unit to wait until the solar power unit is deployed before entering the new location.

8. A method comprising:
   identifying a first location, the first location being a location at which a solar power unit is deployed, the solar power unit being configured to convert light into electricity using one or more solar panels;
   detecting, using one or more sensors embedded on the solar power unit, a redeployment event for the solar power unit at the first location;
   determining, in response to detecting the redeployment event for the solar power unit at the first location, a new location for the solar power unit;
   relocating the solar power unit to the new location; and
   causing the solar power unit to return to a base station to provide power to the base station, the base station being configured to house a plurality of solar power units and to store energy received from the plurality of solar power units, wherein the solar power unit comprises one or more interconnecting plugs configured to dock and share the converted electricity with one or more other solar power units and with the base station.

9. The method of claim 8, wherein a second solar power unit is relocating to the new location, the method further comprising:
   determining a combined area of the solar power unit and the second solar power unit when the solar power unit and the second solar power unit are in a deployed state;
   determining an area of the new location;
   determining, by comparing the combined area and the area, that both the solar power unit and the second solar power unit can deploy at the new location; and
   transmitting instructions to the second solar power unit to wait until the solar power unit is deployed before entering the new location.

10. A method comprising:
   deploying one or more solar panels of a solar power unit at a first location to convert light into electricity, the generated electricity being stored in a power storage device of the solar power unit;
   predicting, based on information received from a user device associated with an owner of the solar power unit, that a redeployment event is expected to occur at the first location at a future time;
   determining, in response to predicting the redeployment event at the first location, a new location for the solar power unit;

relocating, by the solar power unit, to the new location prior to an occurrence of the predicted redeployment event;

returning, by the solar power unit, to a base station; and transferring the stored power to the base station, wherein the base station is configured to provide power to one or more other devices that are electrically connected to the base station, the base station being configured to house a plurality of solar power units and to store energy received from the plurality of solar power units, wherein the solar power unit comprises one or more interconnecting plugs configured to dock and share the generated electricity with one or more other solar power units and with the base station.

11. The method of claim 10, wherein the method further comprises:

determining that the solar power unit does not have sufficient charge to return to the base station; and wirelessly transmitting, in response to the determining that the solar power unit does not have sufficient charge to return to the base station, power from the base station to the solar power unit to charge the solar power unit.

12. The method of claim 10, wherein the returning to the base station is performed in response to determining that an amount of charge stored in the power storage device exceeds a threshold.

13. The method of claim 10, wherein the redeployment event is a weather event that reduces solar intensity at the first location, and wherein the determining the new location for the solar power unit comprises:

identifying a first set of locations where the solar power unit is permitted to deploy;

analyzing weather data for the first set of locations, wherein the weather data indicates a solar intensity at each location in the first set of locations at a time of the redeployment event; and selecting, as the new location, the location of the first set of locations having the highest solar intensity at the time of the redeployment event.

14. The method of claim 10, wherein the redeployment event is a potentially hazardous event that is predicted to cause damage to the solar power unit, and wherein the determining the new location for the solar power unit comprises:

identifying a first set of locations where the solar power unit is permitted to deploy;

determining, from the first set of locations, a particular location that provides protection from the potentially hazardous event to the solar power unit; and selecting, as the new location, the particular location.

15. The method of claim 10, wherein the transferring the stored power to the base station comprises:

wirelessly transmitting power from the power storage device to the base station to charge the base station.

16. The method of claim 10, wherein the transferring the stored power to the base station comprises:

transferring the power storage device from the solar power unit to the base station; and transferring a new power storage device from the base station to the solar power unit.

17. The method of claim 1, wherein the solar power unit is configured to stack on top of other solar power units when not deployed.

18. The method of claim 1, further comprising:

deploying the solar power unit from a storage to the first location, wherein a second solar power unit is stacked on top of the solar power unit in the storage prior to the deploying, wherein each of the first and second solar power units comprises:

a set of retractable wheels; and a set of retractable jackstands.

19. The method of claim 18, wherein the deploying the solar power unit to the first location further comprises:

extending, by the solar power unit, the set of retractable wheels on the solar power unit to raise the solar power unit off the ground;

extending, by the second solar power unit, the set of retractable jackstands embedded in the second solar power unit such that the second solar power unit is supported by the set of retractable jackstands;

moving, by the solar power unit, out from under the second solar power unit and to the first location; and retracting, by the second solar power unit, the set of retractable jackstands to lower the second solar power unit to the ground.

20. The method of claim 1, further comprising:

stacking the solar power unit on top of one or more other solar power units after the solar power unit has provided the power to the one or more other devices that are electrically connected to the base station.

* * * * *